(12) United States Patent
Wu

(10) Patent No.: US 11,949,264 B1
(45) Date of Patent: Apr. 2, 2024

(54) PORTABLE CHARGER HAVING VACUUMING FUNCTION

(71) Applicant: Yongquan Wu, Fengcheng (CN)

(72) Inventor: Yongquan Wu, Fengcheng (CN)

( * ) Notice: Subject to any disclaimer, the term of this patent is extended or adjusted under 35 U.S.C. 154(b) by 0 days.

(21) Appl. No.: 18/447,621

(22) Filed: Aug. 10, 2023

(30) Foreign Application Priority Data

Jun. 21, 2023 (EM) .................................. 015025413

(51) Int. Cl.
*H02J 7/00* (2006.01)
*A47L 5/24* (2006.01)
*A47L 7/00* (2006.01)
*A47L 9/28* (2006.01)

(52) U.S. Cl.
CPC .............. *H02J 7/0042* (2013.01); *A47L 5/24* (2013.01); *A47L 7/0085* (2013.01); *A47L 9/2884* (2013.01)

(58) Field of Classification Search
CPC ........ A47L 5/24; A47L 7/0085; A47L 9/2884; H02J 7/045
See application file for complete search history.

(56) References Cited

U.S. PATENT DOCUMENTS

2016/0015227 A1* 1/2016 Conrad ................. A47L 9/1608
15/344

* cited by examiner

*Primary Examiner* — Robert Grant
(74) *Attorney, Agent, or Firm* — Daniel M. Cohn; Howard M. Cohn

(57) ABSTRACT

A portable charger having a vacuuming function includes a power supply portion, a dust suction portion, and a connecting assembly. The power supply portion supplies power to the dust suction portion or an external device. The dust suction portion sucks dust. The connecting assembly connects the power supply portion to the dust suction portion or separates the power supply portion from the dust suction portion. The connecting assembly includes a driving piece, at least two connecting pieces, and an elastic piece. The elastic piece is fixedly connected to the at least two connecting pieces. The driving piece drives the at least two connecting pieces to move, and synchronously drives the elastic piece to deform to stretch, so that the driving piece, the elastic piece, and the at least two connecting pieces are switched from a first state to a second state.

20 Claims, 14 Drawing Sheets

PORTABLE CHARGER HAVING VACUUMING FUNCTION

TECHNICAL FIELD

The present disclosure relates to a field of multifunctional portable chargers, and in particular to a portable charger having a vacuuming function.

BACKGROUND

A power bank, also known as a portable power supply or a mobile charger, is a portable charger that is convenient for carrying and reserved power. The power bank is applied in a scenario where no external power supply is provided. For instance, the power bank provides power for consumer electronics (such as mobile phones and laptops), home appliance products (such as vacuum cleaners, fans, toothbrushes, flashlights, etc.).

Among them, a jump starter is an emergency rescue device to start a car when a car battery is insufficient or exhausted. As user needs continue to increase (such as needs of road trips), the jump starter provides guarantee for car travel. Therefore, the jump starter is also a type of portable charger, which is understood as a power bank.

In addition, as more and more devices need to be charged, power banks in the prior art has more and more functions. For example, multifunctional power banks can not only charge the consumer electronics, but also charge the home appliance products, and can further charge the car battery so as to start the car normally. However, the multifunctional power banks generally contain more and more parts, and a volume thereof gets larger and larger.

For instance, there is a conventional portable charger including a power supply portion and a dust suction portion. The power supply portion is fixedly connected to the dust suction portion. The power supply portion supplies the dust suction portion, so that the dust suction portion vacuums. The power supply portion of the conventional portable charger further comprises a first charging module and a first charging interface configured to charge the consumer electronics such as the mobile phones. The power supply portion of the conventional portable charger further comprises a second charging module and a second charging interface configured to charge the car battery. As a result, the conventional portable charger has a large volume and is inconvenient for carrying.

SUMMARY

The present disclosure provides a portable charger having a vacuuming function, which is convenient to carry.

The portable charger having the vacuuming function comprises a power supply portion, a dust suction portion, and a connecting assembly.

The power supply portion is configured to supply power to the dust suction portion or an external device. The dust suction portion is configured to suck dust when the power supply portion supplies power to the dust suction portion. The connecting assembly is configured to connect the power supply portion to the dust suction portion. The connecting assembly is further configured to separate the power supply portion from the dust suction portion.

The connecting assembly comprises a driving piece, at least two connecting pieces, and an elastic piece. The elastic piece is fixedly connected to the at least two connecting pieces. The driving piece is configured to drive the at least two connecting pieces to move, and synchronously drives the elastic piece to deform to stretch, so that the driving piece, the elastic piece, and the at least two connecting pieces are switched from a first state to a second state, and the power supply portion is separated from the dust suction portion.

The elastic piece drives the at least two connecting pieces to move based on an elastic force of the elastic piece after being stretched, and synchronously drives the driving piece to move, so that the driving piece, the elastic piece, and the at least two connecting pieces are switched from the second state to the first state, and the power supply portion is connected to the dust suction portion.

In the present disclosure, the power supply portion and the dust suction portion are connected or separated through the connecting assembly. When the power supply portion and the dust suction portion are separated through the connecting assembly, the power supply portion is able to be carried and used separately. Compared with carrying the portable charger of the present disclosure, since a volume of the power supply portion is far more less than the portable charger, it is more convenient to carry the power supply portion directly, which improves a carrying performance of the power supply portion.

After the power supply portion and the dust suction portion are connected together, the power supply portion powers the dust suction portion, and the dust suction portion sucks the dust when the power supply portion supplies power to the dust suction portion.

The driving piece of the connecting assembly of the present disclosure drives the at least two connecting pieces to move and synchronously drives the elastic piece to deform, so as to separate the power supply portion and the dust suction portion. In a process of deformation, the elastic pieces is stretched and generated the elastic force. The elastic force drives the at least two connecting piece and synchronously drives the driving piece after being stretched, so that the power supply portion is connected to the dust suction portion.

It should be noted that because the elastic piece is stretched and generates the elastic force during the deformation process, the elastic piece drives the at least two connecting pieces and synchronously drives the driving piece based on the elastic force. When the power supply portion is separated from the dust suction portion through the connecting assembly, the elastic force drives the at least two connecting pieces and the driving piece to reset, no external force is needed, and the at least two connecting pieces and the driving piece are automatically reset. Moreover, the at least two connecting pieces and driving piece are reset to prevent damages of the at least two connecting pieces and the driving piece parts during processes such as carrying or placing.

Similarly, when the connecting assembly connects the power supply portion and the dust suction portion, the elastic piece drives the at least two connecting pieces and the driving piece to reset through the elastic force of the elastic piece. Therefore, the at least two connecting pieces and the driving piece are automatically reset without the external force. After the at least two connecting pieces and the driving piece are reset, the power supply portion is connected to the dust suction portion, so that a connection stability of the power supply portion and the dust suction portion.

DETAILED DESCRIPTION

Figure 1:
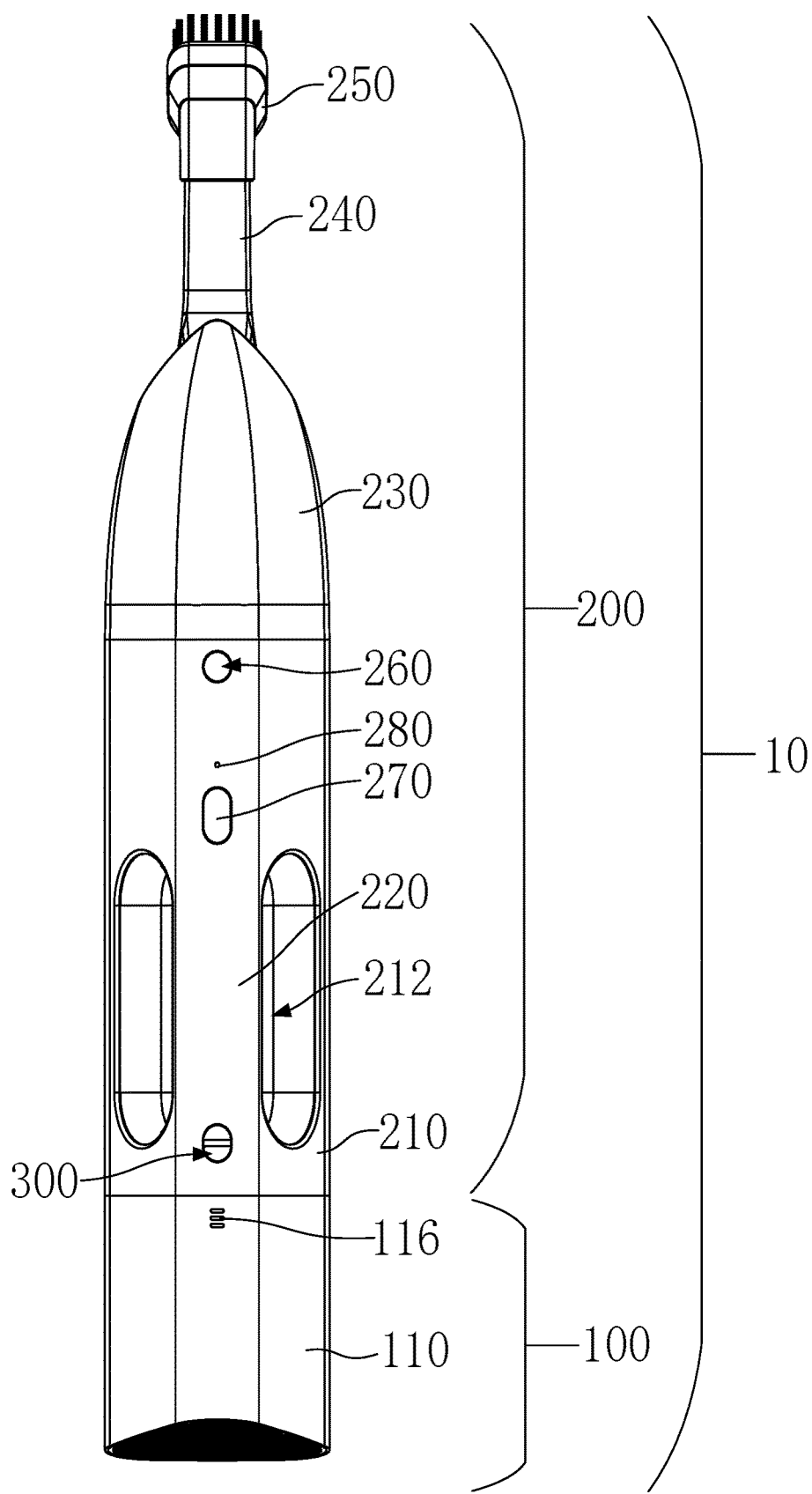
FIG. 1 is a structural schematic diagram of a portable charger having a vacuuming function according to one embodiment of the present disclosure.
Figure 2:
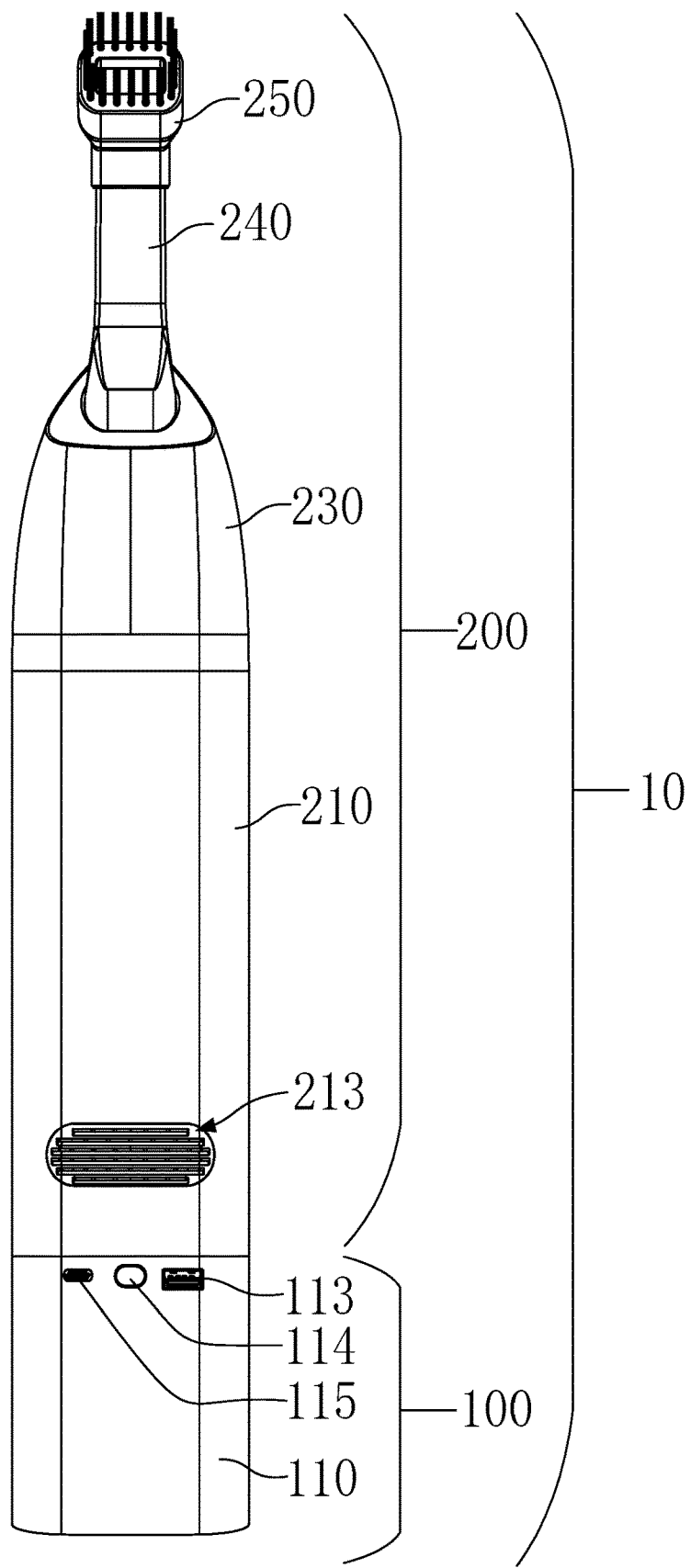
FIG. 2 is another structural schematic diagram of the portable charger having the vacuuming function according to one embodiment of the present disclosure.

Embodiments of the present disclosure provide a multifunctional power bank. Specifically, the embodiments of the present disclosure provide a multifunctional power bank having a vacuuming function, charging consumer electronics, charging home appliance products, and charging a car battery. It should be noted that, based on the dust suction function, the multifunctional power bank of the embodiments of the present disclosure further comprises at least one of the functions of charging the consumer electronics, charging the home appliance products, and charging the car battery. Therefore, the multifunctional power bank in the embodiments of the present disclosure also refers to a portable charger having a vacuuming function.

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Reference herein to "embodiment" means that a particular feature, structure, or characteristic described in connection with one embodiment may be included in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

As shown in FIGS. 1-5, the portable charger 10 having the vacuuming function comprises a power supply portion 100, a dust suction portion 200, and a connecting assembly 300 connecting the power supply portion 100 and the dust suction portion 200. The connecting assembly 300 drives the power supply portion 100 to connect to the dust suction portion 200, so the power supply portion 100 supplies power to the dust suction portion 200 and the dust suction portion 200 sucks dust when the power supply portion 100 supplies power to the dust suction portion 200.

The connecting assembly 300 is further configured to separate the power supply portion 100 from the dust suction portion 200, which facilitates carrying of the power supply portion 100. Compared with carrying the portable charger including the power supply portion 100 and the dust suction portion 200, since a volume of the power supply portion is far more less than the portable charger, it is more convenient to carry the power supply portion directly, which improves a carrying performance of the power supply portion.

It should be noted that, in actual research and development process of researches and development personnel of the present disclosure, if the dust suction portion and the power supply portion are directly connected through a plurality of connectors, when in actual use, it is inconvenient to separate the power supply portion. Further, when in actual use, after the power supply portion and the dust suction portion are separated, the plurality of connectors are exposed from the dust suction portion or the power supply portion, so that the plurality of connectors are easily damaged, which affects a connection performance of the plurality of connectors, and even affects a connection stability of the plurality of connectors to the power supply portion 100 and the dust suction portion 200.

Based on these problems found in the actual research and development process of the present disclosure, a driving piece of the connecting assembly of the embodiment of the present disclosure is able to drive at least two connecting pieces to move and synchronous drive an elastic piece to deform, which realizes an effective separation of the power supply portion 100 and the dust suction portion 200. During a deformation process, the elastic piece is stretched to generate an elastic force. The elastic force drives the at least two connecting piece and synchronously drives the driving piece after being stretched, so that the power supply portion is connected to the dust suction portion.

It should be noted that because the elastic piece is stretched and generates the elastic force during the deformation process, the elastic piece drives the at least two connecting pieces and synchronously drives the driving piece based on the elastic force. When the power supply portion is separated from the dust suction portion through the connecting assembly, the elastic force drives the at least two connecting pieces and the driving piece to reset, no external force is needed, and the at least two connecting pieces and the driving piece are automatically reset. Moreover, the at least two connecting pieces and driving piece are reset to prevent damages of the at least two connecting pieces and the driving piece parts during processes such as carrying or placing.

Similarly, when the connecting assembly connects the power supply portion 100 and the dust suction portion 200, the elastic piece drives the at least two connecting pieces and the driving piece to reset through the elastic force of the elastic piece. Therefore, the at least two connecting pieces and the driving piece are automatically reset without the external force. After the at least two connecting pieces and the driving piece are reset, the power supply portion is connected to the dust suction portion, so that a connection stability of the power supply portion and the dust suction portion.

Therefore, compared with the plurality of connectors in the prior art, the connecting assembly 300 in the embodiment is convenient to separate the power supply portion 100 and the dust suction portion 200, and the elastic piece is able to reset the at least two connecting pieces and the driving piece through elastic deformation. The elastic piece protects the at least two connecting pieces and the driving piece from exposing out of the power supply portion 100 or the dust suction portion 200, thus preventing the at least two connecting pieces and the driving piece from damage.

Please refer to relevant schematic diagrams of the connecting assembly to illustrate a structure of the connecting assembly, as well as a connection relationship between the connecting assembly, the power supply portion 100, and the dust suction portion 200.

Figure 6:
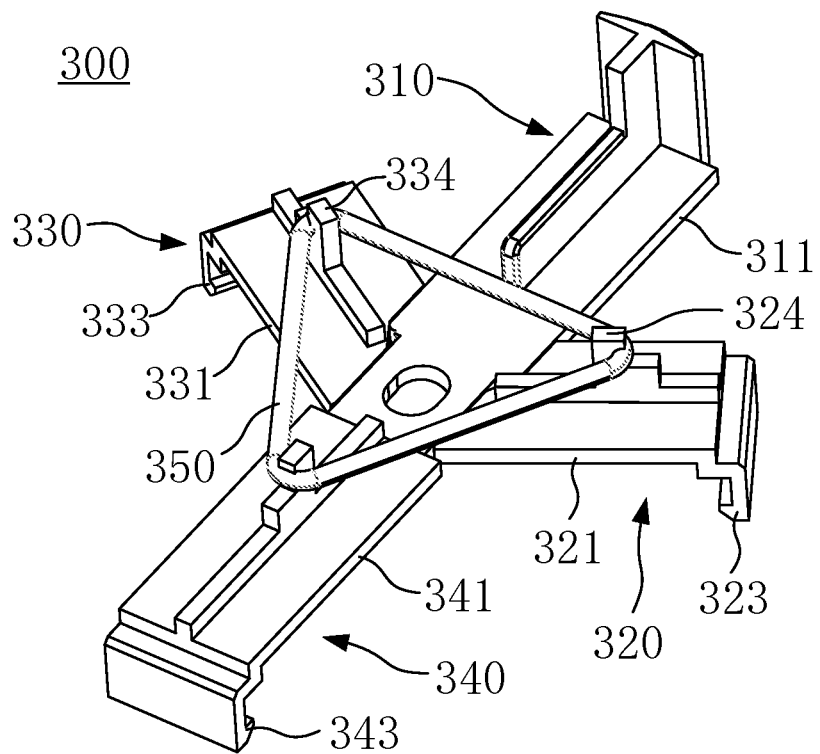
FIG. 6 is a structural schematic diagram of a connecting assembly of the portable charger having the vacuuming function according to one embodiment of the present disclosure.
Figure 7:
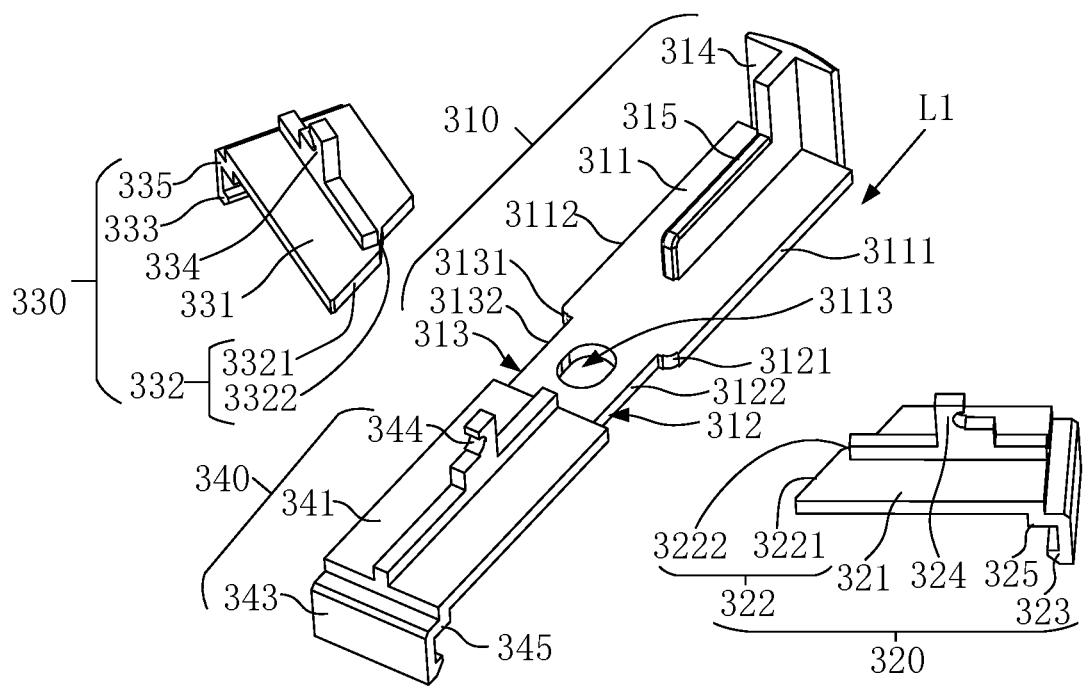
FIG. 7 is a partial exploded schematic diagram of the connecting assembly shown in FIG. 6.
Figure 8:
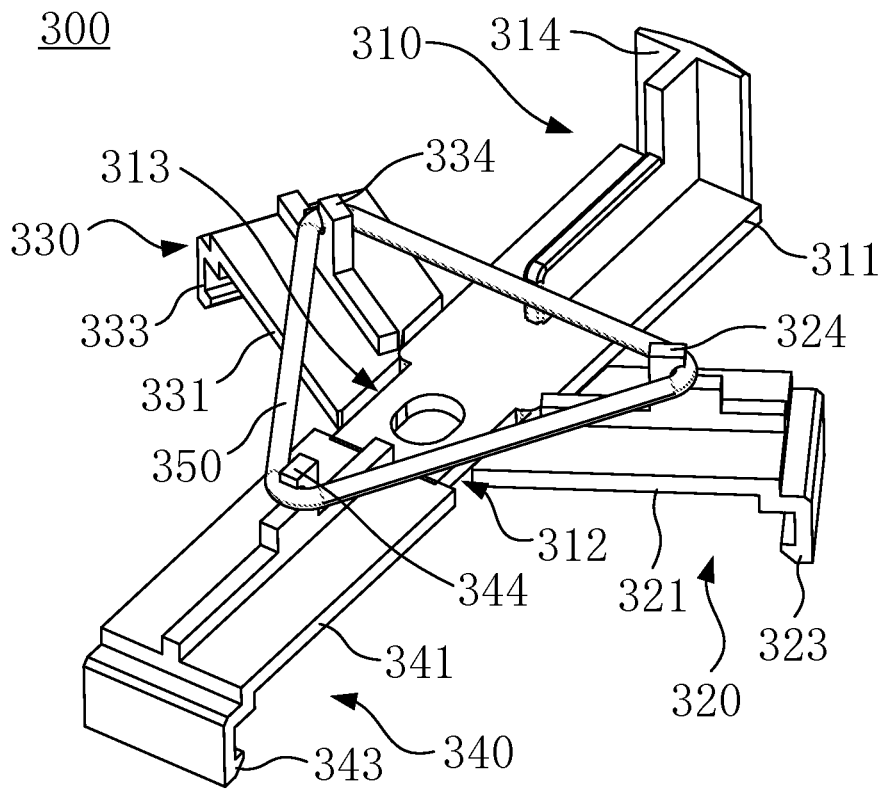
FIG. 8 is another structural schematic diagram of the connecting assembly of the portable charger having the vacuuming function according to one embodiment of the present disclosure.

As shown in FIGS. 6-8, the connecting assembly 300 is configured to connect the power supply portion 100 to the dust suction portion 200. The connecting assembly 300 is further configured to separate the power supply portion 100 from the dust suction portion 200. The connecting assembly 300 comprises a driving piece 310, at least two connecting pieces, and an elastic piece 350. The elastic piece 350 is fixedly connected to the at least two connecting pieces.

The driving piece 310 is configured to drive the at least two connecting pieces to move, and the driving piece 310 synchronously drives the elastic piece 350 to deform to stretch, so that the driving piece 310, the elastic piece 350, and the at least two connecting pieces are switched from a first state to a second state, and the power supply portion 100 is separated from the dust suction portion 200.

The elastic piece 350 drives the at least two connecting pieces to move based on the elastic force of the elastic piece 350 generated after being stretched, and the elastic piece 350 synchronously drives the driving piece 310 to move, so that the driving piece 310, the elastic piece 350, and the at least two connecting pieces are switched from the second state to the first state, and the power supply portion 100 is connected to the dust suction portion 200.

As shown in FIG. 6, the driving piece 310, the elastic piece 350, and the at least two connecting pieces are in the first state.

As shown in FIG. 8, the driving piece 310, the elastic piece 350, and the at least two connecting pieces are in the second state.

In one embodiment, the at least two connecting pieces comprise a first connecting piece 320, a second connecting piece 330, and a third connecting piece 340. The first connecting piece 320 and the second connecting piece 330 are respectively disposed on two sides of the driving piece 310. The third connecting piece 340 is disposed in an extending direction L1 of the driving piece 350.

For those skilled in the art, the at least two connecting pieces are not limited to including the first connecting piece 320, the second connecting piece 330, and the third connecting piece 340. Alternatively, the number of the at least two connecting pieces may be two, four, or other numbers. For example, the at least two connecting pieces comprise a first connecting piece and a second connecting piece, the first connecting piece and the second connecting piece are disposed on two sides of the driving piece, and the first connecting piece and the second connecting piece are symmetrically disposed relative to the driving piece. For another example, the at least two connecting pieces comprise a first connecting piece and a second connecting piece, the first connecting piece is disposed in the extending direction of the driving piece and is integrally disposed with the driving piece, and the second connecting piece is disposed on a same side of the driving piece and the first connecting piece.

In the present disclosure, the at least two connecting pieces are the first connecting piece 320, the second connecting piece 330, and the third connecting piece 340 for further illustration. The driving piece 310 comprises a driving body 311. The driving body 311 comprises a first side wall 3111 and a second side wall 3112 disposed opposite to the first side wall 3111. The driving body 311 defines a first groove 312 on the first side wall 3111 and a second groove 313 on the second side wall 3112.

The first connecting piece 320 comprises a first connecting body 321 and a first protruding portion 322 fixedly connected to the first connecting body 321. The second connecting piece 330 comprises a second connecting body 331 and a second protruding portion 332 fixedly connected to the second connecting body 331.

When the driving piece 310, the elastic piece 350, and the at least two connecting pieces are in the first state, the first protruding portion 322 is located in the first groove 312, and the second protruding portion 332 is located in the second groove 313.

When the driving piece 310, the elastic piece 350, and the at least two connecting pieces are in the second state, at least a portion of the first protruding portion 322 is not located in the first groove 312, and at least a portion of the second protruding portion 332 is not located in the second groove 313. When the driving piece 310, the elastic piece 350, and the at least two connecting pieces are in the second state, the first protruding portion 322 abuts against the first side wall 3111, and the second protruding portion 332 abuts against the second side wall 3112.

The driving body 311 comprises a first sub-wall 3121 and a second sub-wall 3122. The first sub-wall 3121 and the second sub-wall 3122 form the first groove 312. The first sub-wall 3121 is connected to the second sub-wall 3122. The first sub-wall 3121 is connected to the first side wall 312. The first sub-wall 3121 is inclined relative to the first side wall 312 or the second sub-wall 3122.

The driving body 311 comprises a third sub-wall 3131 and a fourth sub-wall 3132. The third sub-wall 3131 and the fourth sub-wall 3132 form the second groove 313. The third sub-wall 3132 is connected to the fourth sub-wall 3132. The third sub-wall 3131 is connected to the second side wall 3112. The third sub-wall 3131 is inclined relative to the second side wall 3112 or the fourth sub-wall 3132.

The first protruding portion 322 comprises a first end wall 3221 away from the first connecting body 321 and a first inclined wall 3222. The first inclined wall 3222 connects the first end wall 3221 to the first connecting body 321. An inclination of the first inclined wall 3222 is matched with an inclination of the first sub-wall 3121.

The second protruding portion 332 comprise a second end wall 3321 away from the second connecting body 331 and a second inclined wall 3322. The second inclined wall 3322 connects the second end wall 3321 and the second connecting body 331. An inclination of the second inclined wall 3322 is matched with an inclination of the third sub-wall 3131.

In a process where the driving piece 310, the elastic piece 350, and the at least two connecting pieces are mutually switched between the first state and the second state, the first inclined wall 3222 abuts against the first sub-wall 3121 and moves relative to the first sub-wall 3121. The second inclined wall 3322 abuts against the third sub-wall 3131 and moves relative to the third sub-wall 3131.

As shown in FIG. 6, the driving piece 310, the elastic piece 350, and the at least two connecting pieces are in the first state. The first sub-wall 3121 and the first end wall 3221 are attached to each other in the first groove 312. The third sub-wall 3131 and the second end wall 3321 are attached to each other in the second groove 313. The first inclined wall 3222 and the first sub-wall 3121 are attached to each other in the first groove 312. The second inclined wall 3322 and the third sub-wall 3131 are attached to each other in the second groove 313.

As shown in FIG. 8, the driving piece 310, the elastic piece 350, and the at least two connecting pieces are in the second state. The first sub-wall 3121 and the first end wall 3221 are spaced apart in the first groove 312 to form a first gap. The third sub-wall 3131 and the second end wall 3321 are spaced apart in the second groove 313 to form a second gap. A portion of the first inclined wall 3222 is attached to the first sub-wall 3121, and the other portion of the first inclined wall 3222 is located outside the first side wall 3111. A portion of the second inclined wall 3322 is attached to the third sub-wall 3131, and the other portion part of the second inclined wall 3322 is located outside the second side wall 3112.

In one optional embodiment, the first connecting piece 320 and the second connecting piece 330 are symmetrically disposed relative to the driving piece 310.

In one optional embodiment, the driving piece 310 and the third connecting piece 340 are integrally disposed. The driving piece 310 and the third connecting piece 340 are integrally formed. A first end of the driving body 311 is configured for a user to operate. For example, an operation plate 314 is disposed on the first end of the driving body 311. The operation plate 314 is integrally formed with the driving body 311. A second end of the driving body 311 and the third connecting piece 340 are integrally formed. The user is able to directly drive the third connecting piece 340 by driving the operation plate, so the first connecting piece 320 is driven through cooperation between the first sub-wall 3121 and the first inclined wall 3222, and the second connecting piece 330 is driven through cooperation between the third sub-wall 3131 and the second inclined wall 3322.

In one optional embodiment, in order to strengthen a connection stability between the driving body 311 and the operation plate 314, a reinforcing plate 315 is disposed between the driving body 311 and the operation plate 314. The operation plate 314 and the reinforcing plate 315 protrude from a same surface of the driving body 311.

In one optional embodiment, each of the connecting pieces comprises a positioning structure. Each positioning structure comprises a protruding block and a positioning groove defined thereon. A groove wall of each positioning groove is matched with a surface of the elastic piece. For example, the groove wall of each positioning groove is arc-shaped and a cross-section of the elastic piece is circular. For instance, the first connecting piece 320 comprises a first positioning structure 324, the second connecting piece 330 comprises a second positioning structure 334, and the third connecting piece 340 comprises a third positioning structure 344. The first positioning structure 324 is disposed on the first connecting body 321, the second positioning structure 334 is disposed on the second connecting body 331, and the third positioning structure 344 is disposed on the third connecting body 341. Therefore, the elastic piece 350 is limited by the first positioning structure 324, the second positioning structure 334 and the third positioning structure 344. Specifically, the elastic piece 350 is limited in a firs positioning hole of the first positioning structure 324, a second positioning hole of the second positioning structure 334, and a third positioning hole of the third positioning structure 344.

In one optional embodiment, when the driving piece 310, the elastic piece 350, and the at least two connecting pieces are in the first state, a first distance X1 is defined between the first positioning structure 324 and the second positioning structure 334, a second distance X2 is defined between the first positioning structure 324 and the third positioning structure 344, and a third distance X3 is defined between the second positioning structure 334 and the third positioning structure 344. X1=X2=X3. When the driving piece 310, the elastic piece 350, and the at least two connecting pieces are in the second state, a fourth distance Y1 is defined between the first positioning structure 324 and the second positioning structure 334, a fifth distance Y2 is defined between the first positioning structure 324 and the third positioning structure 344, and a sixth distance Y3 is defined between the second positioning structure 334 and the third positioning structure 344. Y1=Y2=Y3.

That is, when the driving piece 310 drives the first connecting piece 320, the second connecting piece 330, and the third connecting piece 340 to move, the first connecting piece 320, the second connecting piece 330, and the third connecting piece 340 move in a same distance. When the elastic piece 350 drives the first connecting piece 320, the second connecting piece 330, and the third connecting piece 340 to move, moving distances of the first connecting piece 320, the second connecting piece 330, and the third connecting piece 340 are the same. Therefore, when the elastic piece 350 is driven to deform by the driving piece 310, the force subjected to the elastic piece is uniform, so service life of the elastic piece 350 is prolonged.

Figure 9:
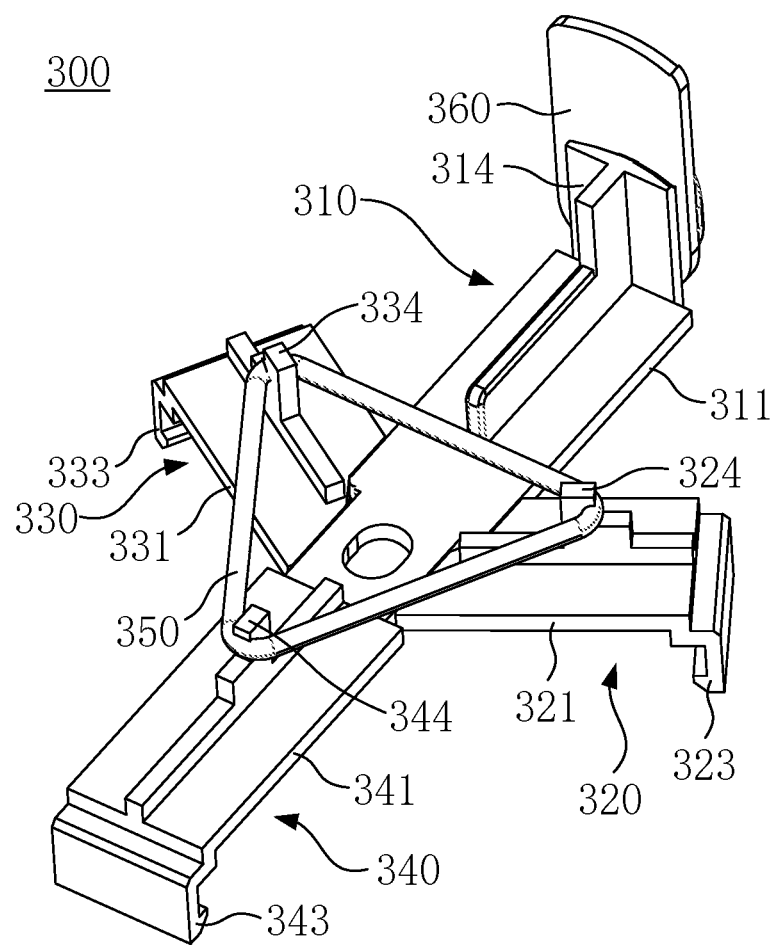
FIG. 9 is another structural schematic diagram of the connecting assembly of the portable charger having the vacuuming function according to one embodiment of the present disclosure.

As shown in FIG. 9, in order to facilitate the user to drive the operation plate 314, in one optional embodiment, the connecting assembly 300 further comprises a button 360, and the button 360 is matched with the operation plate 314.

For example, the button 360 may be attached to the operation plate 314. A portion of the button 360 passes through the dust suction portion 200 or the power supply portion 100. In the embodiment of the present disclosure, an example that the portion of the button 360 passes through the dust suction portion 200 is taken and described. As shown in FIGS. 1-5, the dust suction portion 100 defines an opening 211 and the button 360 is exposed from the opening 211. The user is able to operate the button 360 at a position of the opening 211 of the dust suction portion 200 to drive the driving piece 310 to move, thereby driving the first connecting piece 320, the second connecting piece 330, and the third connecting piece 340 to move, and driving the elastic piece 350 to synchronously deform.

Figure 3:
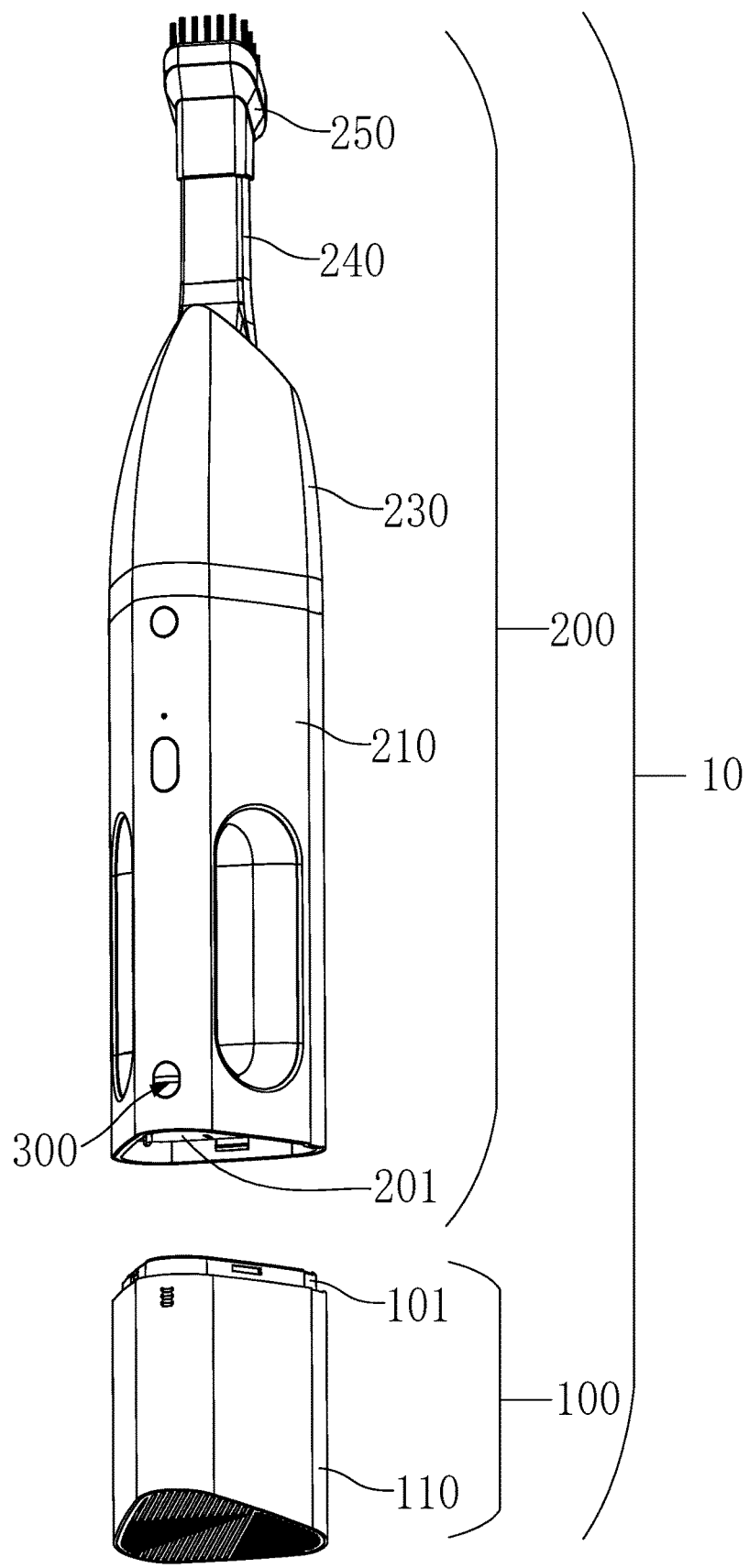
FIG. 3 is an exploded schematic diagram of the portable charger having the vacuuming function shown in FIG. 1.
Figure 4:
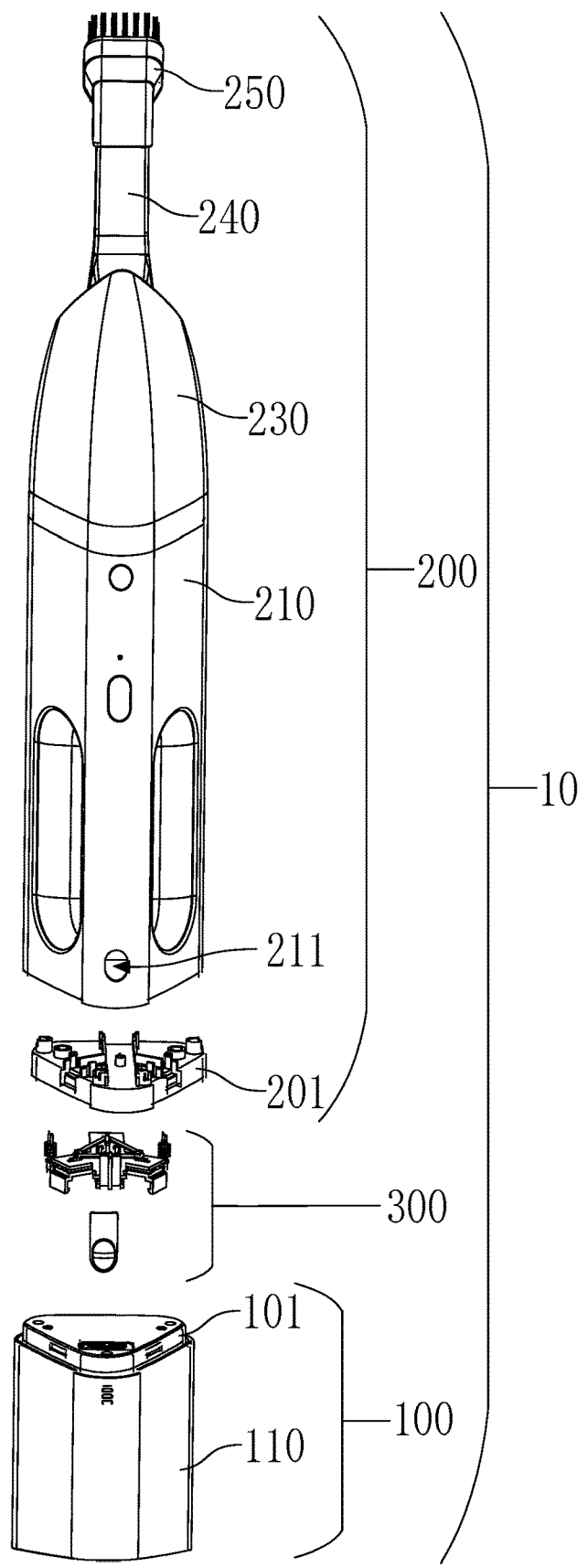
FIG. 4 is another exploded schematic diagram of the portable charger having the vacuuming function shown in FIG. 1.
Figure 5:
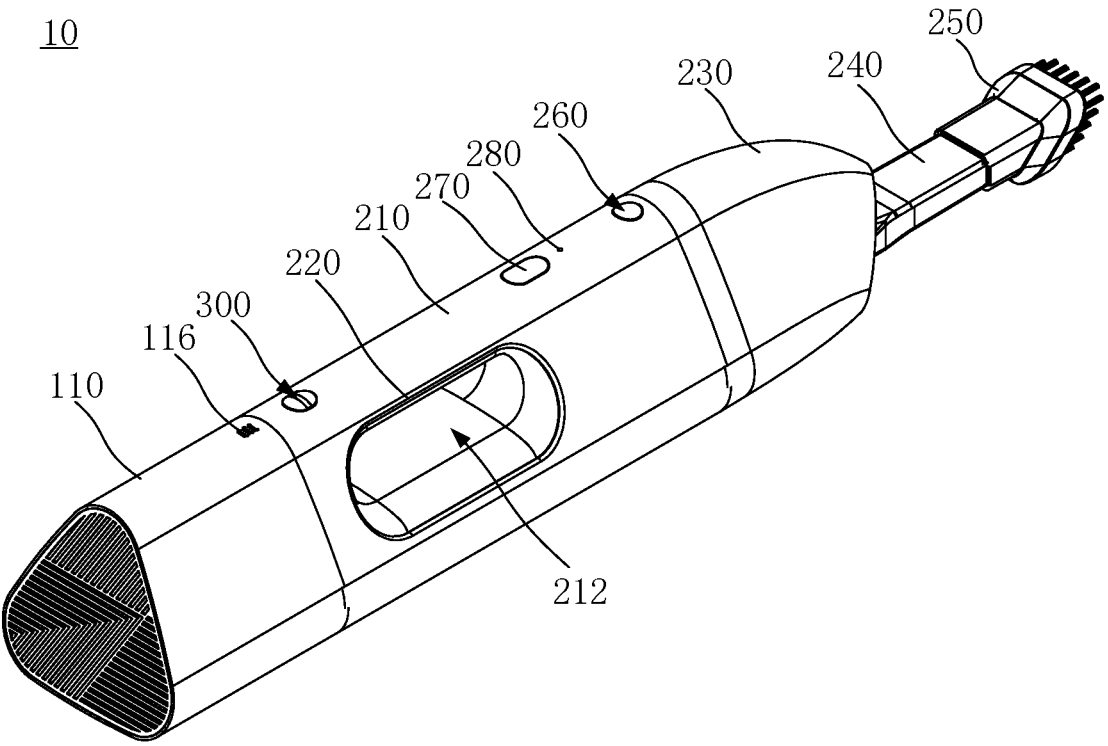
FIG. 5 is a perspective schematic diagram of the portable charger having the vacuuming function shown in FIG. 1.

In the embodiment, as shown in FIGS. 3 and 4, the dust suction portion 200 defines a first end portion 201 configured to connect to the power supply portion 100. The power supply portion defines 100 a second end portion 101 configured to connect to the dust suction portion 200. The connecting assembly 300 is limited to the first end portion 201 of the dust suction portion 200. It should be understood that the connecting assembly 300 may be limited to the second end portion 101 of the power supply portion defines 100.

Figure 10:
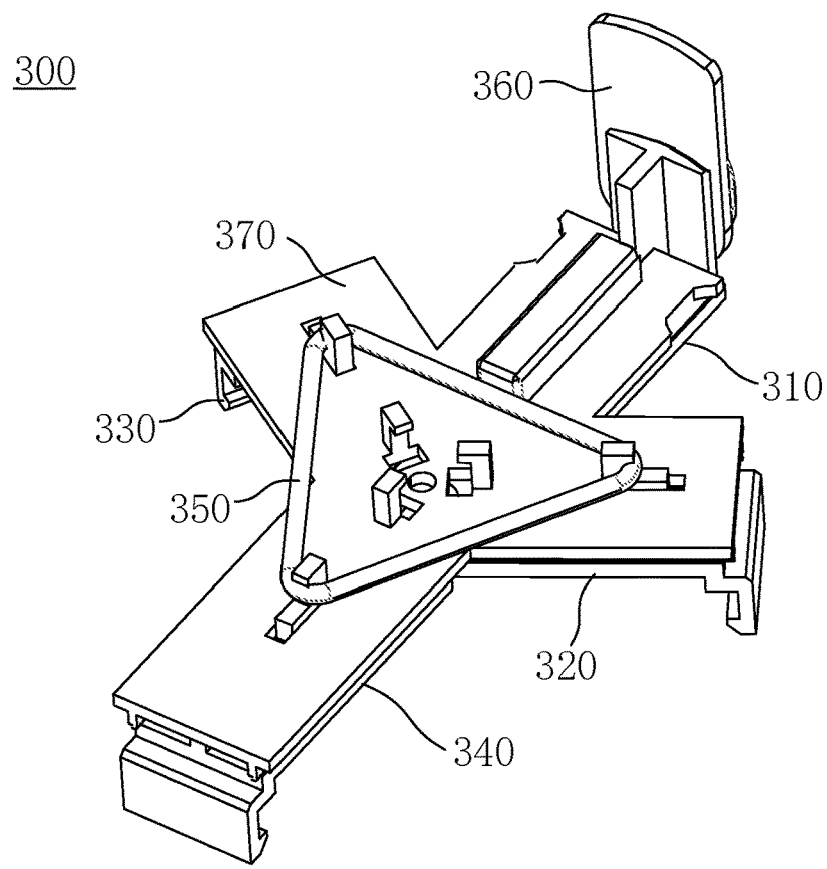
FIG. 10 is another structural schematic diagram of the connecting assembly of the portable charger having the vacuuming function according to one embodiment of the present disclosure.
Figure 11:
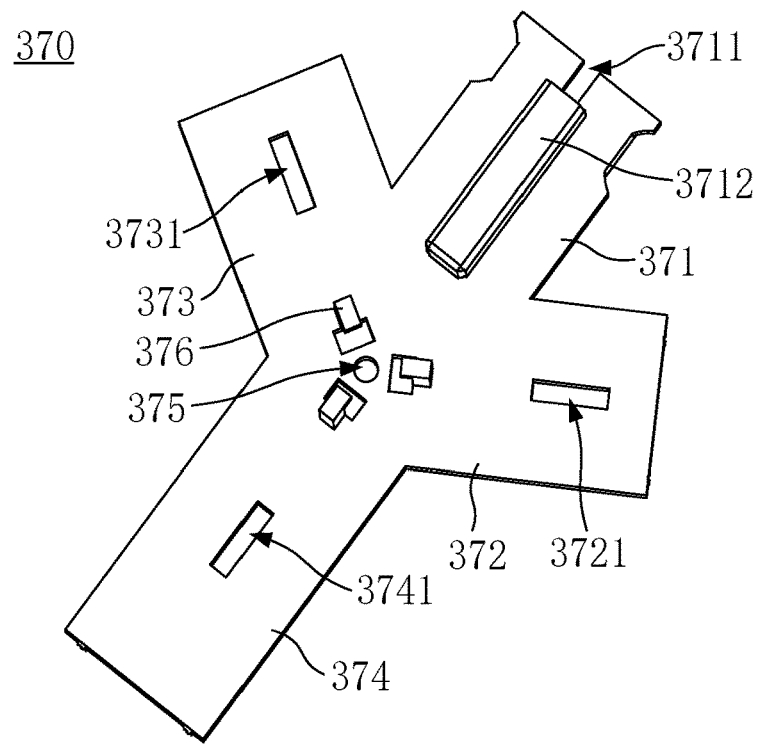
FIG. 11 is a structural schematic diagram of limiting pieces of the connecting assembly shown in FIG. 10.

As shown in FIGS. 10 and 11, the connecting assembly 300 further comprises a limiting piece 370. The limiting piece 370 limits the driving piece 310, the first connecting piece 320, the second connecting piece 330, and the third connecting piece 340 in the dust suction portion 200.

The elastic piece 350 and the at least two connecting pieces are respectively located on two opposite surfaces of the limiting piece 370. The limiting piece 370 defines the first positioning hole 3721, the second positioning hole 3731, and the third positioning hole 3741.

The first positioning structure 324 protrudes out from the first positioning hole 3721 of limiting piece 370 to fixedly connect to the elastic piece 350. The second positioning structure 334 protrudes out from the second positioning hole 3731 of the limiting piece 370 to fixedly connect to the elastic piece 350. The third positioning structure 344 protrudes out from the third positioning hole 3741 of the limiting piece 370 to fixedly connect to the elastic piece 350.

The limiting piece 370 comprises a first limiting portion 371, a second limiting portion 372, a third limiting portion 373, and a fourth limiting portion 374. The first limiting portion 371 is corresponding to the driving piece 310 to limit the driving piece 310. The second limiting portion 372 is corresponding to the first connecting piece 320 to limit the second connecting piece 330. The third limiting portion 373 is corresponding to the second connecting piece 330 to limit the second connecting piece 330. The fourth limiting portion 374 is corresponding to the third connecting piece 340 to limit the third connecting piece 340. The first positioning hole 3721 is defined on the second limiting portion 372. The second positioning hole 3731 is defined on the third limiting portion 373. The third positioning hole 3741 is defined on the fourth limiting portion 374. One end of the first limiting portion 371 away from the third limiting portion 371 defines an opening 3711 for spacing apart from a portion of the reinforcing plate 315 of the driving piece 310, such as a portion of the driving piece 310 located on the operation plate 314, so as to facilitate a movement of the driving piece 310. A cover plate 3712 matched with a structure of the reinforcing plate 315 is disposed on the first limiting portion 371. The cover plate 3712 covers a portion of the reinforcing plate 315, such as a portion of the reinforcing plate 315 located on the driving body 311.

Figure 12:
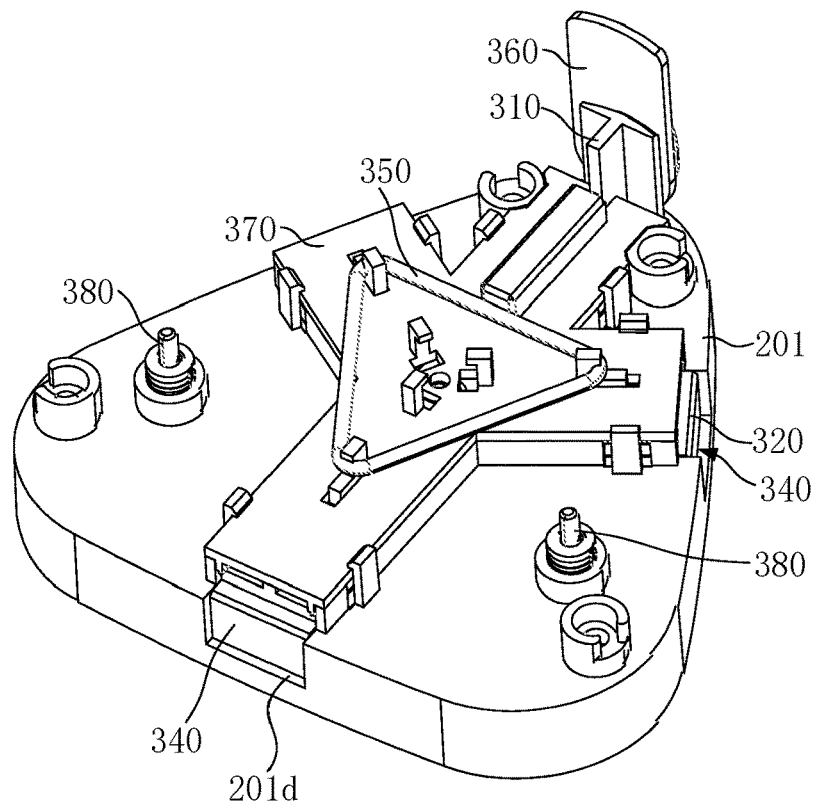
FIG. 12 is a structural schematic diagram of the connecting assembly and a dust suction portion of the portable charger having the vacuuming function according to one embodiment of the present disclosure where the connecting assembly is assembled with the dust suction portion.
Figure 13:
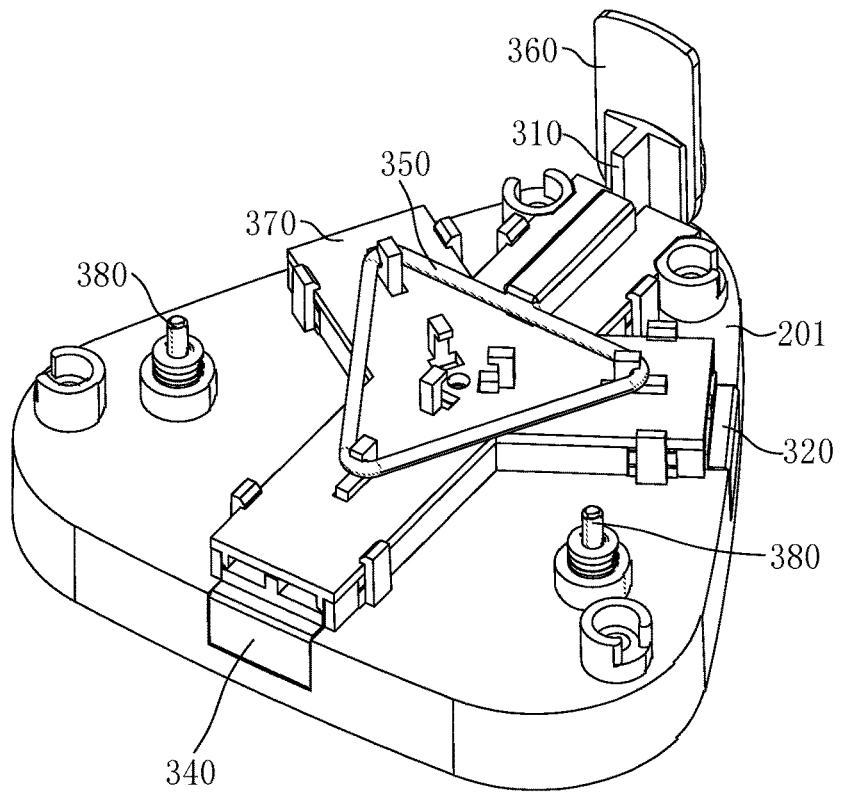
FIG. 13 is another structural schematic diagram of the connecting assembly and the dust suction portion of the portable charger having the vacuuming function according to one embodiment of the present disclosure where the connecting assembly is assembled with the dust suction portion.
Figure 14:
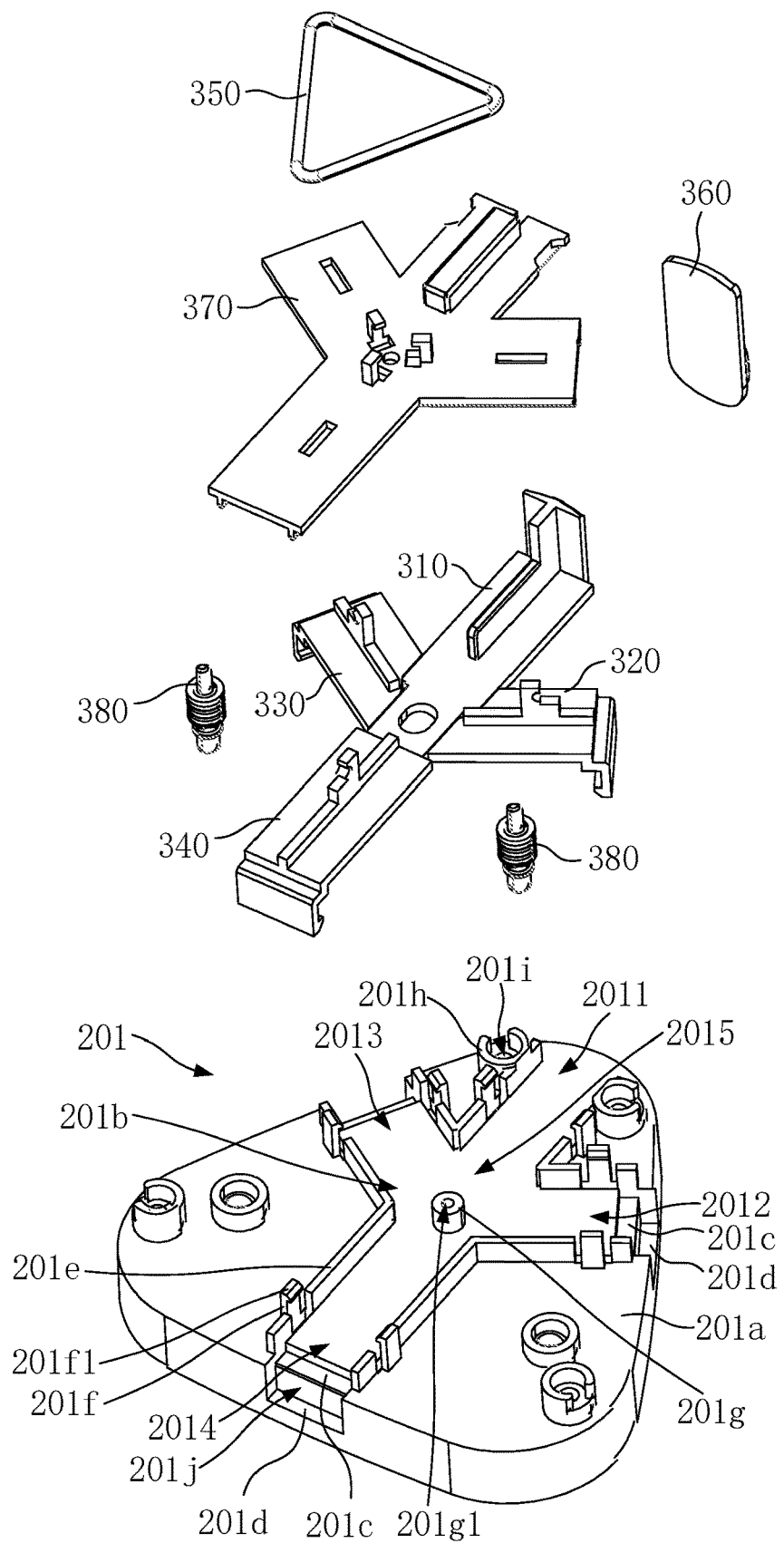
FIG. 14 is an exploded schematic diagram of the connecting assembly and the dust suction portion shown in FIG. 12.

As shown in FIGS. 12-14, the dust suction portion 200 comprises a limiting groove 201b defined on the first end portion 201 of the dust suction portion. The driving piece 310 and the at least two connecting pieces are limited in the limiting groove 201b and are movable in the limiting groove 201n.

It should be noted that the first end portion 201 of the dust suction portion may be a portion of a housing of the dust collection portion 200. The housing of the dust collection portion 200 may be an integrated structure, or may comprise shells. According to one embodiment of the present disclosure, the housing of the dust collection portion 200 comprises the shells. The first end portion 201 is understood as one of the shells of the dust suction portion 200, and the one of the shells is disposed on one end of the dust suction portion 200. It should also be noted that, after the first end portion 201 and other shells of the dust suction portion 200 are fixedly connected, the connecting assembly 300 is limited inside the dust suction portion 200, and a structure of the connecting assembly 300 fixedly connected to the power supply portion 100 is exposed. Therefore, the connecting assembly 300 is effectively protected.

In one optional embodiment, the limiting groove 201b comprises a first sub-groove 2011, a second sub-groove 2012, a third sub-groove 2013, and a fourth sub-groove 2014. The first sub-groove 2011 is configured to accommodate the driving piece 310. The second sub-groove 2012 is configured to accommodate the first connecting piece 320. The third sub-groove 2013 is configured to accommodate the second connecting piece 330. The fourth sub-groove 2014 is configured to accommodate the third connecting piece 340.

In one optional embodiment, the limiting groove further comprises a fifth sub-groove 2015. The fifth sub-groove 2015 is communicated with the first sub-groove 2011, the second sub-groove 2012, the third sub-groove 2013, and the fourth sub-groove 2014. The first sub-groove 2011, the second sub-groove 2012, the third sub-groove 2013, and the fourth sub-groove 2014 are disposed on an outer side of the fifth sub-groove 2015. The driving piece 310 cooperates with the first connecting piece 320, the second connecting piece 330, and the third connecting piece 340 in the fifth sub-groove 2015, and the driving piece 310 drives the first connecting piece 320, the second connecting piece 330, and the third connecting piece 340 to move in the fifth sub-groove 2015.

The second sub-groove 2012 and the third sub-groove 2013 are disposed on two sides of the first sub-groove 2011. The second sub-groove 2012 and the third sub-groove 2013 are symmetrically disposed relative to the first sub-groove 2011. The fourth sub-groove 2014 is disposed in an extending direction of the first sub-groove 2011.

The limiting piece 370 covers the limiting groove 201b, so the driving piece 310, the first connecting piece 320, the second connecting piece 330, and the third connecting piece 340 are limited in the limiting groove 201b.

The dust suction portion 200 comprises supporting boards 201e and limiting blocks 201f. The supporting boards 201e and the limiting blocks 201f are disposed at the first end portion 201 of the dust suction portion. The supporting boards 201e and the limiting blocks 201f are disposed around the limiting groove 201b. The limiting piece 370 is disposed on the supporting boards 201e. The limiting blocks 201f are disposed on a side edge of the limiting piece 370 at intervals to limit the limiting piece 370 to move in the first direction. The first direction may be understood as a direction parallel to an end surface of the first end portion 201 of the dust suction portion, such as a horizontal direction of the portable charger when the portable charger 10 is placed vertically.

The limiting blocks 201*f* comprises limiting structures 201*f*1. Each of the limiting structures 201*f*1 is disposed on a free end of each of the limiting blocks 201*f*. The limiting structures 201*f*1 are configured to limit the limiting piece 370 to move in a second direction. The second direction and the first direction are perpendicular to each other. In one optional embodiment, the limiting structures 201*f*1 may be clamping structures, and the clamping structures are clamped with a surface of the limiting piece 370.

A main body structure 201*a* is disposed on the first end portion 201 of the dust suction portion 200. The limiting groove 201*b* is defined on one side of the main body structure 201*a*. The supporting boards 201*e* and the limiting blocks 201*f* are disposed on a same surface of the main body structure 201*a*. The main body structure 201*a* comprises first steps 201*c*, second steps 201*d* disposed on the same surface of the main body structure 201*a*. The first steps 201*c* are respectively disposed at a bottom wall of the second sub-groove 2012, a bottom wall of the third sub-groove 2013, and a bottom wall of the fourth sub-groove 2014. Fixing structures configured to fixedly connect to the power supply portion 100 are placed on the first steps 201*c*. The fixing structures are respectively disposed on the first connecting piece 320, the second connecting piece 330, and the third connecting piece 340. The second steps 201*d* are one-to-one disposed at a bottom portion of the first steps 201*c*.

As shown in FIGS. 6-10, the at least two connecting pieces comprise fixing structures. For instance, the first connecting piece 320 comprises a first fixing structure 323 of the fixing structures. The second connecting piece 330 comprises a second fixing structure 333 of the fixing structure. The third connecting piece 340 comprises a third fixing structure 343 of the fixing structure. The first fixing structure 323, the second fixing structure 333, and the third fixing structure 343 may a hook or a snap structure. The first fixing structure 323 is disposed on one end of the first connecting piece 320 and is away from the elastic piece 350. The second fixing structure 333 is disposed on one end of the second connecting piece 330 and is away from the elastic piece 350. The third fixing structure 343 is disposed on one end of the third connecting piece 340 and is away from the elastic piece 350.

The first fixing structure 323 is disposes on a first one of the second steps 201*d* and is movable in a space limited by the first one of the second steps 301*d*. The second fixing structure 333 is disposes on a second one of the second steps 301*d* and is movable in a space limited by the second one of the second steps 301*d*. The third fixing structure 343 is disposes on a third one of the second steps 301*d* and is movable in a space limited by the third one of the second steps 301*d*.

Figure 15:
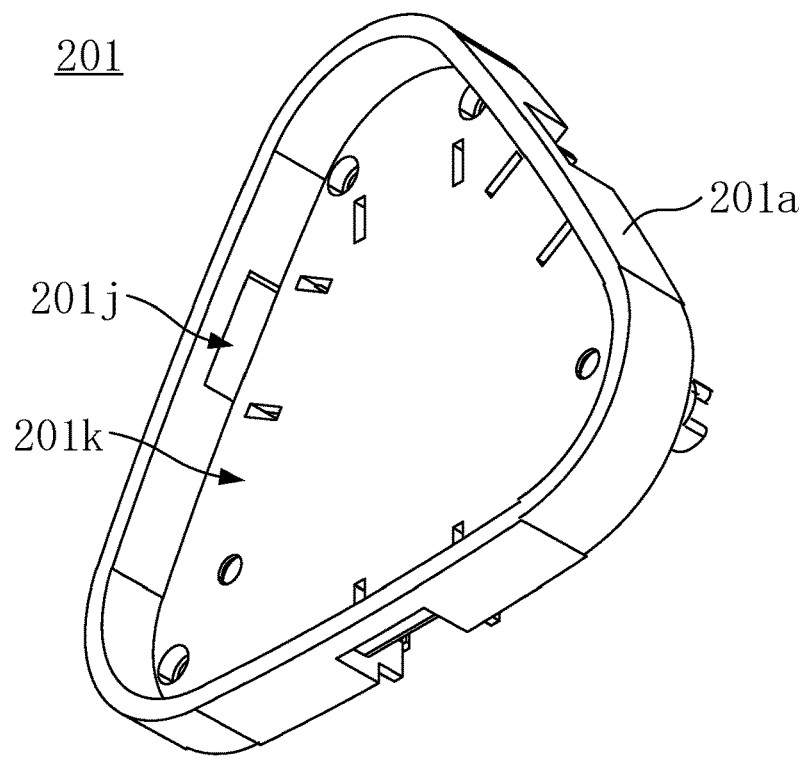
FIG. 15 is a structural schematic diagram of a first end portion of the dust suction portion of the portable charger having the vacuuming function according to one embodiment of the present disclosure.

As shown in FIGS. 14 and 15, through holes 201*j* are respectively defined on the second steps 201*d* of the first end portion 201 of the dust suction portion.

The first fixing structure 323 is exposed out from one surface of the main body structure 201*a* through a first one of the through holes 201*j*. The second fixing structure 333 is exposed out from the one surface of the main body structure through a second one of the through holes 201*j*. The third fixing structure 343 is exposed out from the one surface of the main body structure 201*a* through a third one of the through holes 201*j*. An accommodating groove 201*k* is defined on the one surface of the main body structure 201*a*. The accommodating groove 201*k* is configured to accommodate the second end portion 101 of the power supply portion 100; so that the first connecting piece 320, the second connecting piece 330, and the third connecting piece 340 are fixedly connected to the second end portion 101 of the power supply portion 100.

Figure 16:
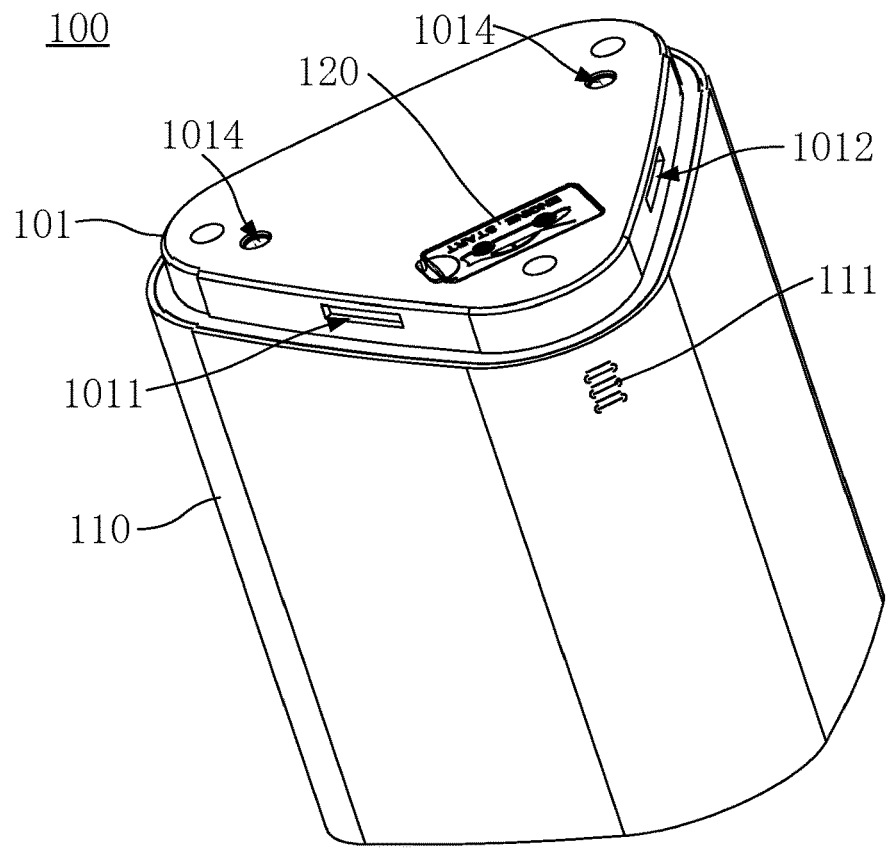
FIG. 16 is a perspective schematic diagram of a power supply portion of the portable charger having the vacuuming function according to one embodiment of the present disclosure.
Figure 17:
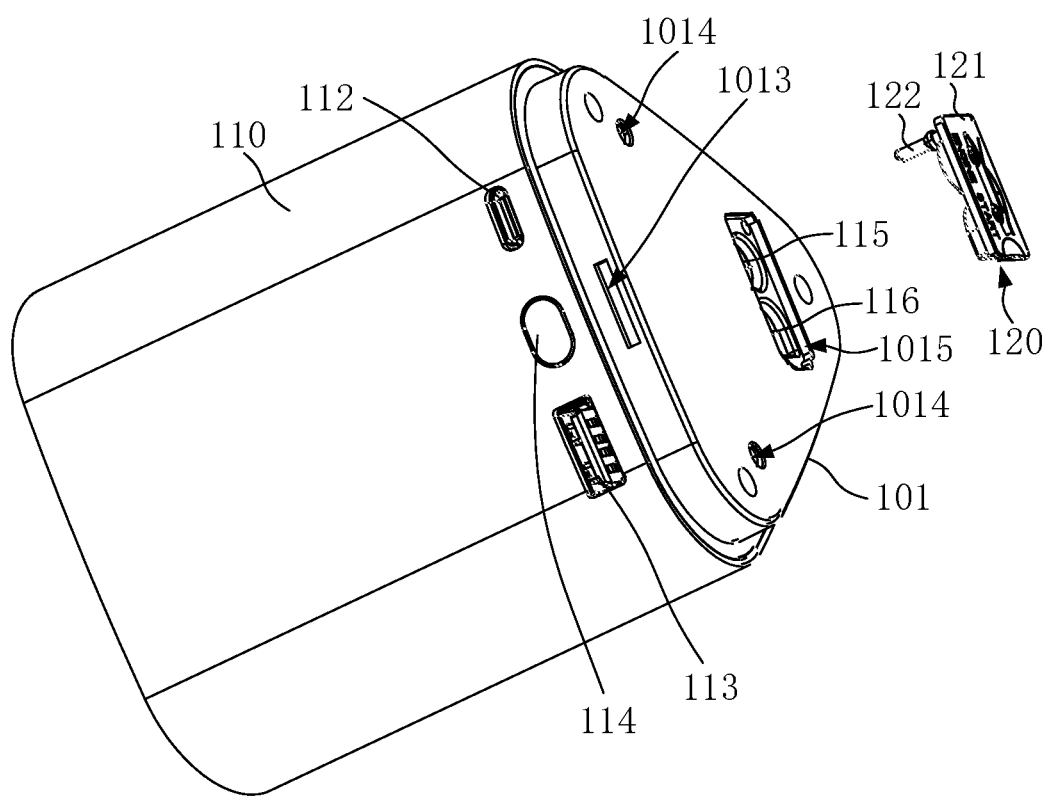
FIG. 17 is an exploded schematic diagram of the power supply portion shown in FIG. 16.

As shown in FIGS. 16 and 17, the power supply portion 100 comprises connecting structures disposed on the second end portion 101. Each of the connecting structures is connected to a corresponding connecting piece of the at least two connecting pieces to connect the power supply portion 100 to the dust suction portion 200. Each of the connecting structures is separated from the corresponding connecting piece to separate the power supply portion 100 from the dust suction portion 200.

In one optional embodiment, the connecting structures comprise a first connecting structure 1011, a second connecting structure 1012, and a third connecting structure 1013. The first connecting structure 1011 is fixedly connected to or separated from the first fixing structure 323. The second connecting structure 1012 is fixedly connected to or separated from the second fixing structure 333. The third connecting structure 1013 is fixedly connected to or separated from the third fixing structure 343. For example, the first fixing structure 323, the second fixing structure 333, and the third fixing structure 343 are clamping structures or hook structures, and the first connecting structure 1011, the second connecting structure 1012, and the third connecting structure 1013 are groove structures.

The second end portion 101 is accommodated in the accommodating groove 201*k*, so the first connecting structure 1011, the second connecting structure 1012, and the third connecting structure 1013 is respectively matched with a corresponding through hole 201*j* of the through holes.

When the power supply portion 100 and the dust suction portion 200 need to be assembled, the user can press the button 360 to drive the driving piece 310 to move. The driving piece 310 moves to drive the first connecting piece 320, the second connecting piece 330, and the third connecting piece 340 to move, so that the first fixing structure 323, the second fixing structure 333 and the third fixing structure 343 respectively move at positions of the second steps 201*d* and the through holes 201*j* toward an edge of the main body structure 201*a*. Then, the first connecting structure 1011, the second connecting structure 1012, and the third connecting structure 1013 of the power supply portion 100 are aligned with the through holes 201*j* respectively. Then the power supply portion 100 and the dust suction portion 200 are aligned and assembled, so that the second end portion 101 of the power supply portion 100 is accommodated in the accommodating groove 201*k*. Then, the user can release the button 360. At this time, the elastic piece 350 generates the elastic force because the elastic piece 350 is driven by the driving piece 310 to stretch. When the external force disappears, the elastic piece 50 drives the first connecting piece 320, the second connecting piece 330, and the third connecting piece 340 to move toward a central portion of the main body structure 201*a* through the elastic force, so that the first fixing structure 323, the second fixing structure 333, and the third fixing structure 343 are respectively fixedly connected to the first connecting structure 1011, the second connecting structure 1012 and the third connecting structure 1013, which realizes the assembly of the power supply portion 100 and the dust suction portion 200.

When the power supply part 100 needs to be separated from the dust suction portion 200, the user can press the button 360 to drive the driving piece 310 to move, and then the driving piece drives the first connecting piece 320, the second connecting piece 330, and the third connecting piece 340 to move, so that the first fixing structure 323, the second fixing structure 333, and the third fixing structure 343 move towards the central portion of the main body structure 201a respectively at the positions of the second steps 201d and the through holes 201j. Then, the power supply portion 100 and the dust suction portion 200 are separated. After the power supply portion 100 is separated from the dust suction portion 200, the user can release the button 360. At this time, the elastic piece 350 has the elastic force since the elastic piece is driven by the driving piece 310 and is in a stretched state. When the external force disappears, the elastic piece 350 drives the first connecting piece 320, the second connecting piece 330, and the third connecting piece 340 to move toward the central portion of the main body structure 201a, by the elastic force so that the first fixing structure 323, the second fixing structure 333, and the third fixing structure 343 move toward the central portion of the main body structure 201a. Therefore, the first connecting piece 320, the second connecting piece 330, and the third connecting piece 340 are not exposed and are prevented from damage. Moreover, automatic reset is also be realized.

In order to facilitate the user to operate the power supply portion 100, in the embodiment of the present disclosure, an anti-slip structure 111 is provided on a surface of a power supply body 110 of the power supply portion 100 to increase a frictional force for the user to operate the power supply body 110.

The portable charger 10 of the embodiment of the present disclosure further comprises two contacts 380 configured to electrically connect to the dust suction portion 200 and the power supply portion 100. The two contacts 380 are fixed to the first end portion 201 of the dust suction portion. Two connecting holes 1014 are defined on the second end portion 101 of the power supply portion 100. The contacts 380 one-to-one extend into the connecting holes 1014, so as to realize an electrical connection between the power supply portion 100 and the dust suction portion 200.

In one optional embodiment, as shown in FIG. 7, the first connecting piece further 320 comprises a first limiting structure 325 connecting the first fixing structure 323 and the first connecting body 321. The second connecting piece 330 further comprises a second limiting structure 335 connecting the second fixing structure 333 and the second connecting body 331. The third connecting piece 340 further comprises a third limiting structure 345 connecting the third fixing structure 343 and the third connecting body 341. The first limiting structure 325 is disposed on a first one of the first steps 201c and is movable in the first one of the first steps 201c. The second limiting structure 335 is disposed on a second one of the first steps 201c and is movable in the second one of the first steps 201c. The third limiting structure 345 is disposed on a third one of the first steps 201c and is movable in the third one of the first steps 201c.

In one optional embodiment, the dust suction portion 200 comprises a limiting column 201g disposed at the first end portion 201 of the dust suction portion. The limiting column 201g is disposed on the central portion of the main body structure. At least a portion of the limiting column 201g is located in the fifth sub-groove 2015. The limiting column 201g defines a fixing hole 201g1. The driving piece 310 defines a first punch hole 3113. The limiting column 201g passes through the first punch hole 3113. An area of an orthographic projection of the first punch hole 3113 on the dust suction portion is greater than an area of a cross section of the limiting column 201g, so that the driving piece 310 is movable. The limiting piece 370 defines a second punch hole 375. The limiting column 201g passes through the second punch hole 375. The second punch hole 375 is communicated with the fixing hole 201g1.

In one optional embodiment, the connecting assembly 300 further comprises a fixing piece, and the fixing piece passes through the second punch hole 375 and is fixed in the fixing hole 201g1.

In one optional embodiment, the limiting piece 370 further comprises a plurality of buckle structures 376 disposed around the second punch hole 375 to ensure the stability of the fixing piece. In one optional embodiment, the main body structure 201a further comprise screw hole columns 201h, and screw holes 201i one-to-one defined on the screw hole columns 201h. An end surface of each of the screw hole columns 201h is flush with a surface of each of the supporting boards 201e. The screw holes 201h each is configured for passing through a screw so as to fixedly connected to other shells of the dust suction portion 200.

In one optional embodiment, the power supply portion 100 further comprises a charging interface 112 defined on the power supply body 110. The power supply portion 100 is charged through a power source by the charging interface 112.

In one optional embodiment, the power supply portion 100 further comprises a control switch 114 disposed on the power supply body 110. The control switch 114 is configured to turn on or turn off the power supply portion 100.

In one optional embodiment, the power supply portion 100 further comprise a first power supply interface 113 defined on the power supply body 110. The first power supply interface 113 is configured to charge external devices such as consumer electronics and home appliance products.

In one optional embodiment, the power supply part 100 further comprises a second power supply interface 115 and a third power supply interface 116 disposed on the power supply body 110. The second power supply interface 115 and the third power supply interface 116 are configured to jointly charge the car battery. In the embodiment of the present disclosure, in order to prevent the second power supply interface 115 and the third power supply interface 116 from damage, the power supply portion 100 further comprises a sealing cover 120. The sealing cover 120 covers the second power supply interface 115 and the third power supply interface 116. Specifically, the power supply body 110 defines a slot 1015. The sealing cover 120 comprises a sealing portion 121 and a connecting portion 122. The connecting portion 122 is fixedly connected to the power supply body 110. The sealing portion 121 is disposed in the slot 1015 to cover the second power supply interface 115 and the third power supply interface 116. It should be noted that the connecting portion 122 is detachably connected to the power supply body 110.

Figure 18:
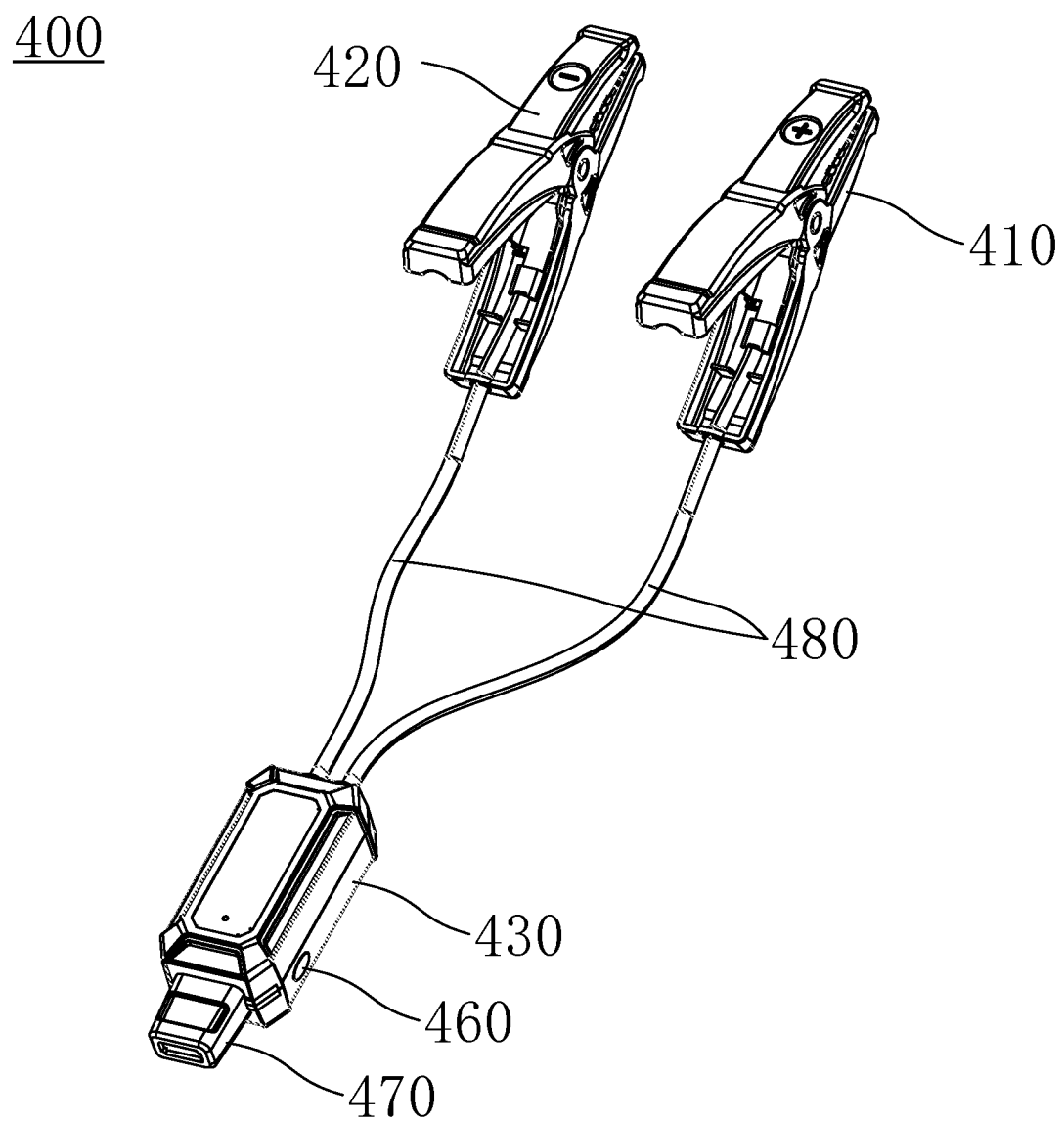
FIG. 18 is a perspective schematic diagram of a car battery connecting device of the portable charger having the vacuuming function according to one embodiment of the present disclosure.
Figure 19:
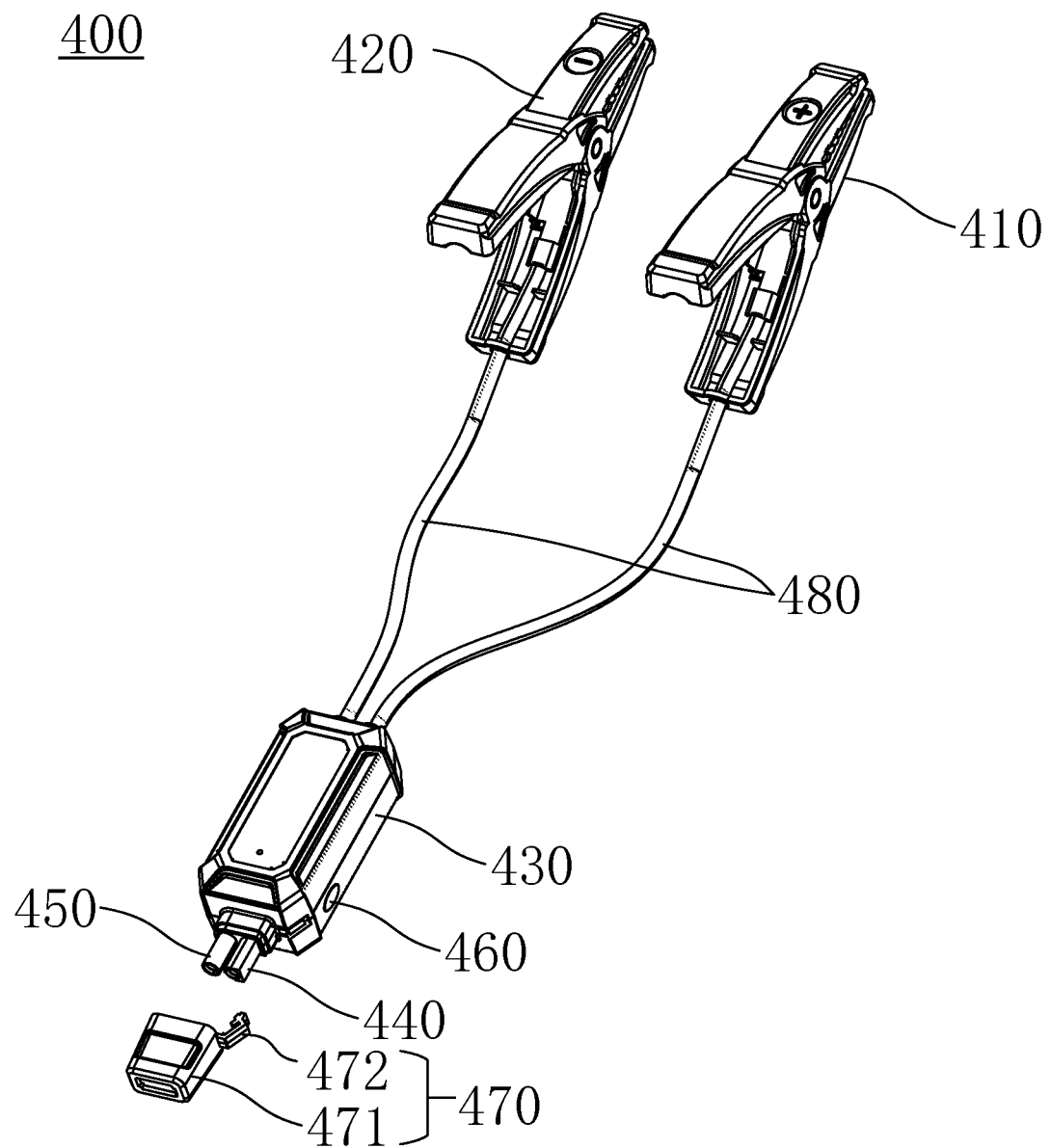
FIG. 19 is an exploded schematic diagram of the car battery connecting device shown in FIG. 18.

As shown in FIGS. 18 and 19, the portable charger 10 further comprises a car connecting device 400. The car connecting device 400 comprises a first clamping structure 410, a second clamping structure 420, a main body 430, a first connecting head 440, and a second connecting head 450. The first connecting head 440 is electrically connected to the first clamping structure 410 through a first one of wires 480, and the second connecting head 450 is electrically connected to the second clamping structure 420 through a second one of the wires 480. The first connecting head 440 and the second connecting head 450 are fixed on the main body 430. The first clamping structure 410 is connected to a positive pole of the car battery, and the second clamping structure is connected to a negative pole of the car battery. The first connecting head 440 is inserted into the second power supply interface 115, and the second connecting head 450 is inserted into the third power supply interface 116, so as to realize the electrical connection between the power supply portion 100 and the car connecting device 400.

In one optional embodiment, the car connecting device 400 further comprises a first indicator light 460. The first indicator light 460 is disposed on the main body 430. The first indicator light 460 is configured to indicate a connecting state between the portable charger 10 and the car battery. If a connection between the portable charger 10 and the car battery is normal, the first indicator light 460 displays in a first connecting state. If the connection between the portable charger 10 and the car battery is abnormal, the first indicator light 460 displays in a second connecting state.

In one optional embodiment, the car connecting device 400 further comprises a protective cover 470. The protective cover 470 is connected to the main body 430. The protective cover 470 is sleeved on the first connecting head 440 and the second connecting head 450 to protect the first connecting head 440 and the second connecting head 450. The protective cover 470 comprises an outer cover 471 and a connecting band 472 connected to the outer cover 471. The connecting band 472 is fixedly connected to the main body 430.

It should be noted that the power supply portion 100 further comprises a battery and a circuit board structure. Improvement points of the portable charger 10 of the embodiments of the present disclosure are not in other parts of the power supply portion 100, and is not depicted in details herein.

In one optional embodiment, the dust suction portion 200 comprises a vacuum cleaner housing 210. The vacuum cleaner housing 210 defines a holding space 212. The dust suction portion 200 further comprises a handle 220 disposed at the holding space 212.

In one optional embodiment, the dust suction portion 200 further comprises a vacuum cleaner switch 270 disposed on the vacuum cleaner housing 210. The vacuum cleaner switch 270 is configured to turn on or turn off the dust suction portion 200. The dust suction portion 200 further comprises a second indicator light 280 disposed on the vacuum cleaner housing 210. The second indicator light 280 is configured to indicate a working state of the dust suction portion 200. If the dust suction portion 200 is in the working state, the second indicator light 280 is on. If the dust suction portion 200 is in a non-working state, the second indicator light 280 is off.

In one optional embodiment, the dust suction portion 200 further comprises a dust collector 230, a suction pipe 240, and a brush head 250. The dust collector 230 is fixedly connected to the vacuum cleaner housing 210. The suction pipe 240 is detachably connected to the dust collector 230. The brush head 250 is detachably connected to the suction pipe 240. Therefore, during a vacuuming process, the suction pipe 240 is able to be used separately for dust collection, or the brush head 250 is able to be assembled on the suction pipe 240 for dust collection, which realizes different dust collection needs.

In one optional embodiment, the dust collector 230 and the vacuum cleaner housing 210 are fixedly connected through a connection component 260. The connection component 260 is configured to fix the vacuum cleaner housing 210 to the dust collector 230 and is further configured to separate the vacuum cleaner housing 210 from the dust collector 230. The connection component 260 may have a structure same as the connecting assembly 300, or may have other structures, which is not limited therein.

It should be understood that the dust suction portion 200 of the embodiment of the present disclosure may further comprise a vacuum cleaner filter, a circuit board, etc. Improvement points of the portable charger 10 of the embodiments of the present disclosure are not in other parts of the dust suction portion 100, and is not depicted in details herein.

The portable charger 10 having the vacuuming function of the embodiments of the present disclosure is depicted in detail above. In the specification, specific examples are used to illustrate the principle and implementations of the present disclosure. The description of the above embodiments is only used to help understand methods and core idea of the present disclosure. For those skilled in the art, according to the idea of the present disclosure, changes may be made in specific implementations and application scope. Therefore, the specification should not be regarded as limitations to the present disclosure.

What is claimed is:

1. A portable charger having a vacuuming function, comprising:
   a power supply portion,
   a dust suction portion, and
   a connecting assembly;
   wherein the power supply portion is configured to supply power to the dust suction portion or an external device; the dust suction portion is configured to suck dust when the power supply portion supplies power to the dust suction portion; the connecting assembly is configured to connect the power supply portion to the dust suction portion; the connecting assembly is further configured to separate the power supply portion from the dust suction portion;
   wherein the connecting assembly comprises a driving piece, at least two connecting pieces, and an elastic piece; the elastic piece is fixedly connected to the at least two connecting piece;
   wherein the driving piece is configured to drive the at least two connecting pieces to move and synchronously drives the elastic piece to deform to stretch, so that the driving piece, the elastic piece, and the at least two connecting pieces are switched from a first state to a second state, and the power supply portion is separated from the dust suction portion;
   wherein the elastic piece drives the at least two connecting pieces to move based on an elastic force generated by the elastic piece after being stretched, and the elastic piece synchronously drives the driving piece to move, so that the driving piece, the elastic piece, and the at least two connecting pieces are switched from the second state to the first state, and the power supply portion is connected to the dust suction portion;
   the at least two connecting pieces comprise a first connecting piece, a second connecting piece, and a third connecting piece; the first connecting piece and the second connecting piece are respectively disposed on two sides of the driving piece; the third connecting piece is disposed in an extending direction of the driving piece.

2. The portable charger having the vacuuming function according to claim 1, wherein the driving piece comprises a driving body; the driving body comprises a first side wall and a second side wall disposed opposite to the first side wall; the driving body defines a first groove on the first side wall and a second groove on the second side wall;

the first connecting piece comprises a first connecting body and a first protruding portion fixedly connected to the first connecting body;

the second connecting piece comprises a second connecting body and a second protruding portion fixedly connected to the second connecting body;

when the driving piece, the elastic piece, and the at least two connecting pieces are in the first state, the first protruding portion is located in the first groove, and the second protruding portion is located in the second groove;

when the driving piece, the elastic piece, and the at least two connecting pieces are in the second state, at least a portion of the first protruding portion is not located in the first groove, and at least a portion of the second protruding portion is not located in the second groove.

3. The portable charger having the vacuuming function according to claim 2, wherein the driving body comprises a first sub-wall and a second sub-wall; the first sub-wall and the second sub-wall form the first groove; the first sub-wall is connected to the second sub-wall; the first sub-wall is connected to the first side wall; the first sub-wall is inclined relative to the first side wall or the second sub-wall;

the driving body comprises a third sub-wall and a fourth sub-wall; the third sub-wall and the fourth sub-wall form the second groove; the third sub-wall is connected to the fourth sub-wall; the third sub-wall is connected to the second side wall; the third sub-wall is inclined relative to the second side wall or the fourth sub-wall;

the first protruding portion comprises a first end wall away from the first connecting body and a first inclined wall; the first inclined wall connects the first end wall to the first connecting body; an inclination of the first inclined wall is matched with an inclination of the first sub-wall;

the second protruding portion comprise a second end wall away from the second connecting body and a second inclined wall; the second inclined wall connects the second end wall and the second connecting body; an inclination of the second inclined wall is matched with an inclination of the third sub-wall;

in a process where the driving piece, the elastic piece, and the at least two connecting pieces are mutually switched between the first state and the second state, the first inclined wall abuts against the first sub-wall and moves relative to the first sub-wall, and the second inclined wall abuts against the third sub-wall and moves relative to the third sub-wall.

4. The portable charger having the vacuuming function according to claim 3, wherein the first connecting piece and the second connecting piece are symmetrically disposed relative to the driving piece.

5. The portable charger having the vacuuming function according to claim 3, wherein the driving piece and the third connecting piece are integrally disposed.

6. The portable charger having the vacuuming function according to claim 1, wherein the at least two connecting pieces comprise a first connecting piece and a second connecting piece;

wherein the first connecting piece and the second connecting piece are respectively disposed on two sides of the driving piece; the first connecting piece and the second connecting piece are symmetrically disposed relative to the driving piece; or wherein the first connecting piece is disposed in an extending direction of the driving piece and is integrally disposed with the driving piece; the second connecting piece is disposed on a same side of the driving piece and the first connecting piece.

7. The portable charger having the vacuuming function according to claim 1, wherein the dust suction portion defines a first end portion configured to connect to the power supply portion; the power supply portion defines a second end portion configured to connect to the dust suction portion;

wherein the connecting assembly is limited to the first end portion of the dust suction portion;

wherein the power supply portion comprises connecting structures disposed on the second end portion, each of the connecting structures is connected to a corresponding connecting piece of the at least two connecting pieces to connect the power supply portion to the dust suction portion; each of the connecting structures is separated from the corresponding connecting piece to separate the power supply portion from the dust suction portion.

8. The portable charger having the vacuuming function according to claim 7, wherein the dust suction portion comprises a limiting groove defined on the first end portion of the dust suction portion; the driving piece and the at least two connecting pieces are disposed in the limiting groove and are movable in the limiting groove.

9. The portable charger having the vacuuming function according to claim 8, wherein the at least two connecting pieces comprise a first connecting piece, a second connecting piece, and a third connecting piece;

wherein the limiting groove comprises a first sub-groove, a second sub-groove, a third sub-groove, and a fourth sub-groove; the first sub-groove is configured to accommodate the driving piece; the second sub-groove is configured to accommodate the first connecting piece; the third sub-groove is configured to accommodate the second connecting piece; and the fourth sub-groove is configured to accommodate the third connecting piece.

10. The portable charger having the vacuuming function according to claim 9, wherein the limiting groove further comprises a fifth sub-groove; the fifth sub-groove is communicated with the first sub-groove, the second sub-groove, the third sub-groove, and the fourth sub-groove; the first sub-groove, the second sub-groove, the third sub-groove, and the fourth sub-groove are disposed on an outer side of the fifth sub-groove;

the driving piece cooperates with the first connecting piece, the second connecting piece and the third connecting piece in the fifth sub-groove, and the driving piece drives the first connecting piece, the second connecting piece, and the third connecting piece to move in the fifth sub-groove.

11. The portable charger having the vacuuming function according to claim 10, wherein the first connecting piece and the second connecting piece are disposed on two sides of the driving piece; the first connecting piece and the second connecting piece are symmetrically disposed relative to the driving piece; the third connecting piece is disposed in an extending direction of the first connecting piece;

the second sub-groove and the third sub-groove are disposed on two sides of the first sub-groove, the second sub-groove and the third sub-groove are symmetrically disposed relative to the first sub-groove; the fourth sub-groove is disposed in an extending direction of the first sub-groove.

12. The portable charger having the vacuuming function according to claim 10, wherein the connecting assembly further comprises a limiting piece configured to cover the limiting groove, so the driving piece, the first connecting piece, the second connecting piece, and the third connecting piece are limited in the limiting groove.

13. The portable charger having the vacuuming function according to claim 12, wherein the dust suction portion comprises supporting boards and limiting blocks; the supporting boards and the limiting blocks are disposed at the first end portion of the dust suction portion; the supporting boards and the limiting blocks are disposed around the limiting groove;
- wherein the limiting piece is disposed on the supporting boards; the limiting blocks are disposed on a side edge of the limiting piece at intervals to limit the limiting piece to move in the first direction;
- wherein the limiting blocks comprises limiting structures; each of the limiting structures is disposed on a free end of each of the limiting blocks, the limiting structures are configured to limit the limiting piece to move in a second direction; the second direction and the first direction are perpendicular to each other.

14. The portable charger having the vacuuming function according to claim 12, wherein the dust suction portion comprises a limiting column disposed at the first end portion of the dust suction portion; at least a portion of the limiting column is located in the fifth sub-groove; the limiting column defines a fixing hole;
- the driving piece defines a first punch hole; the limiting column passes through the first punch hole; and an area of an orthographic projection of the first punch hole on the dust suction portion is greater than an area of a cross section of the limiting column, so that the driving piece is movable;
- wherein the limiting piece defines a second punch hole; the limiting column passes through the second punch hole; the second punch hole is communicated with the fixing hole.

15. The portable charger having the vacuuming function according to claim 12, wherein the elastic piece and the at least two connecting pieces are respectively located on two opposite surfaces of the limiting piece;
- wherein the first connecting piece comprises a first positioning structure; the second connecting piece comprises a second positioning structure; and the third connecting piece comprises a third positioning structure;
- wherein the limiting piece defines a first positioning hole, a second positioning hole, and a third positioning hole; the first positioning structure protrudes out from the first positioning hole of limiting piece to fixedly connect to the elastic piece; the second positioning structure protrudes out from the second positioning hole of the limiting piece to fixedly connect to the elastic piece; the third positioning structure protrudes out from the third positioning hole of the limiting piece to fixedly connect to the elastic piece.

16. The portable charger having the vacuuming function according to claim 11, wherein the driving piece comprises a driving body; the driving body comprises a first side wall and a second side wall disposed opposite to the first side wall; the driving body defines a first groove on the first side wall and a second groove on the second side wall;
- the first connecting piece comprises a first connecting body and a first protruding portion fixedly connected to the first connecting body;
- the second connecting piece comprises a second connecting body and a second protruding portion fixedly connected to the second connecting body;
- when the driving piece, the elastic piece, and the at least two connecting pieces are in the first state, the first protruding portion is located in the first groove, and the second protruding portion is located in the second groove;
- when the driving piece, the elastic piece, and the at least two connecting pieces are in the second state, at least a portion of the first protruding portion is not located in the first groove, and at least a portion of the second protruding portion is not located in the second groove.

17. The portable charger having the vacuuming function according to claim 16, wherein the driving body comprises a first sub-wall and a second sub-wall; the first sub-wall and the second sub-wall form the first groove; the first sub-wall is connected to the second sub-wall; the first sub-wall is connected to the first side wall; the first sub-wall is inclined relative to the first side wall or the second sub-wall;
- the driving body comprises a third sub-wall and a fourth sub-wall; the third sub-wall and the fourth sub-wall form the second groove; the third sub-wall is connected to the fourth sub-wall; the third sub-wall is connected to the second side wall; the third sub-wall is inclined relative to the second side wall or the fourth sub-wall;
- the first protruding portion comprises a first end wall away from the first connecting body and a first inclined wall; the first inclined wall connects the first end wall to the first connecting body; an inclination of the first inclined wall is matched with an inclination of the first sub-wall;
- the second protruding portion comprise a second end wall away from the second connecting body and a second inclined wall; the second inclined wall connects the second end wall and the second connecting body; an inclination of the second inclined wall is matched with an inclination of the third sub-wall;
- in a process where the driving piece, the elastic piece, and the at least two connecting pieces are mutually switched between the first state and the second state, the first inclined wall abuts against the first sub-wall and moves relative to the first sub-wall; the second inclined wall abuts against the third sub-wall and moves relative to the third sub-wall.

18. The portable charger having the vacuuming function according to claim 16, wherein a main body structure is disposed on the first end portion of the dust suction portion; the main body structure comprises first steps, second steps, and through holes;
- the first steps are respectively disposed at a bottom wall of the second sub-groove; a bottom wall of the third sub-groove, and a bottom wall of the fourth sub-groove; fixing structures configured to fixedly connect to the power supply portion are placed on the first steps; the fixing structures are respectively disposed on the first connecting piece, the second connecting piece, and the third connecting piece;
- the second steps are one-to-one disposed at a bottom portion of the first steps;
- the through holes are one-to-one defined on the second steps
- the first connecting piece comprises a first fixing structure of the fixing structures; the first fixing structure is disposed on one end of the first connecting piece and is away from the elastic piece, the first fixing structure is disposes on a first one of the second steps and is movable in a space limited by the first one of the second steps; and the first fixing structure is exposed out from one surface of the main body structure through a first one of the through holes;

the second connecting piece comprises a second fixing structure of the fixing structure, the second fixing structure is disposed on one end of the second connecting piece and is away from the elastic piece, the second fixing structure is disposes on a second one of the second steps and is movable in a space limited by the second one of the second steps; and the second fixing structure is exposed out from the one surface of the main body structure through a second one of the through holes;

the third connecting piece comprises a third fixing structure of the fixing structure, the third fixing structure is disposed on one end of the third connecting piece and is away from the elastic piece, the third fixing structure is disposes on a third one of the second steps and is movable in a space limited by the third one of the second steps; and the third fixing structure is exposed out from the one surface of the main body structure through a third one of the through holes;

an accommodating groove is defined on the one surface of the main body structure; the accommodating groove is configured to accommodate the second end portion of the power supply portion; so that the first connecting piece, the second connecting piece, and the third connecting piece are fixedly connected to the second end portion of the power supply portion.

19. A portable charger having a vacuuming function, comprising:
   a power supply portion,
   a dust suction portion, and
   a connecting assembly;
   wherein the power supply portion is configured to supply power to the dust suction portion or an external device; the dust suction portion is configured to suck dust when the power supply portion supplies power to the dust suction portion; the connecting assembly is configured to connect the power supply portion to the dust suction portion; the connecting assembly is further configured to separate the power supply portion from the dust suction portion;
   wherein the connecting assembly comprises a driving piece, at least two connecting pieces, and an elastic piece; the elastic piece is fixedly connected to the at least two connecting piece;
   wherein the driving piece is configured to drive the at least two connecting pieces to move and synchronously drives the elastic piece to deform to stretch, so that the driving piece, the elastic piece, and the at least two connecting pieces are switched from a first state to a second state, and the power supply portion is separated from the dust suction portion;
   wherein the elastic piece drives the at least two connecting pieces to move based on an elastic force generated by the elastic piece after being stretched, and the elastic piece synchronously drives the driving piece to move, so that the driving piece, the elastic piece, and the at least two connecting pieces are switched from the second state to the first state, and the power supply portion is connected to the dust suction portion;
   wherein the at least two connecting pieces comprise a first connecting piece and a second connecting piece;
   wherein the first connecting piece and the second connecting piece are respectively disposed on two sides of the driving piece; the first connecting piece and the second connecting piece are symmetrically disposed relative to the driving piece; or
   wherein the first connecting piece is disposed in an extending direction of the driving piece and is integrally disposed with the driving piece; the second connecting piece is disposed on a same side of the driving piece and the first connecting piece.

20. A portable charger having a vacuuming function, comprising:
   a power supply portion,
   a dust suction portion, and
   a connecting assembly;
   wherein the power supply portion is configured to supply power to the dust suction portion or an external device; the dust suction portion is configured to suck dust when the power supply portion supplies power to the dust suction portion; the connecting assembly is configured to connect the power supply portion to the dust suction portion; the connecting assembly is further configured to separate the power supply portion from the dust suction portion;
   wherein the connecting assembly comprises a driving piece, at least two connecting pieces, and an elastic piece; the elastic piece is fixedly connected to the at least two connecting piece;
   wherein the driving piece is configured to drive the at least two connecting pieces to move and synchronously drives the elastic piece to deform to stretch, so that the driving piece, the elastic piece, and the at least two connecting pieces are switched from a first state to a second state, and the power supply portion is separated from the dust suction portion;
   wherein the elastic piece drives the at least two connecting pieces to move based on an elastic force generated by the elastic piece after being stretched, and the elastic piece synchronously drives the driving piece to move, so that the driving piece, the elastic piece, and the at least two connecting pieces are switched from the second state to the first state, and the power supply portion is connected to the dust suction portion;
   wherein the dust suction portion defines a first end portion configured to connect to the power supply portion; the power supply portion defines a second end portion configured to connect to the dust suction portion;
   wherein the connecting assembly is limited to the first end portion of the dust suction portion;
   wherein the power supply portion comprises connecting structures disposed on the second end portion, each of the connecting structures is connected to a corresponding connecting piece of the at least two connecting pieces to connect the power supply portion to the dust suction portion; each of the connecting structures is separated from the corresponding connecting piece to separate the power supply portion from the dust suction portion.

* * * * *